(12) United States Patent
Kato et al.

(10) Patent No.: US 9,070,414 B2
(45) Date of Patent: *Jun. 30, 2015

(54) PLAYBACK APPARATUS, PLAYBACK METHOD, PROGRAM, RECORDING MEDIUM, AND DATA STRUCTURE

(71) Applicant: Sony Corporation, Tokyo (JP)

(72) Inventors: Motoki Kato, Kanagawa (JP); Toshiya Hamada, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/262,303

(22) Filed: Apr. 25, 2014

(65) Prior Publication Data

US 2014/0233911 A1 Aug. 21, 2014

Related U.S. Application Data

(63) Continuation of application No. 10/580,647, filed as application No. PCT/JP2005/002269 on Feb. 15, 2005, now Pat. No. 8,737,822.

(30) Foreign Application Priority Data

Feb. 16, 2004 (JP) .................................. 2004-038574
Apr. 1, 2004 (JP) .................................. 2004-108650

(51) Int. Cl.
*H04N 9/80* (2006.01)
*G11B 27/30* (2006.01)
(Continued)

(52) U.S. Cl.
CPC ................ *G11B 27/30* (2013.01); *G11B 27/10* (2013.01); *G11B 27/32* (2013.01);
(Continued)

(58) Field of Classification Search
CPC ......... H04N 5/45; H04N 5/85; H04N 9/8227; H04N 21/4316; G11B 2220/2541
See application file for complete search history.

(56) References Cited

U.S. PATENT DOCUMENTS 6,088,507 A 7/2000 Yamauchi et al.
7,885,512 B2 2/2011 Takashima et al.
(Continued)

FOREIGN PATENT DOCUMENTS

JP 2002-290919 10/2002
WO 97/38527 10/1997
(Continued)

OTHER PUBLICATIONS

Supplementary European Search Report dated Sep. 6, 2010 of European application No. EP 05 71 0219, 4 pages.
(Continued)

*Primary Examiner* — Huy T Nguyen
(74) *Attorney, Agent, or Firm* — Oblon, McClelland, Maier & Neustadt, L.L.P.

(57) ABSTRACT

The present invention relates to a playback apparatus, a playback method, a program, a recording medium, and a data structure that enable interactive operations when playing back AV content. A controller 34 obtains an order list of audio stream numbers in advance. In response to an instruction to switch audio by a user, the controller obtains the audio stream number subsequent to the audio stream number which is being played back. It is then checked whether a stream that is found to be playable by the playback apparatus is included in a main clip or a sub clip, and the main clip referred to by the Main Path is read together with the clip in which the corresponding audio stream is multiplexed. Then, the audio stream file of the corresponding clip and the file to be played back included in the main clip are selected by the switches 57 through 59, and 77. The selected files are combined by a video data processor 96 and an audio data processor 97, and the combined data is output. The present invention is applicable to playback apparatuses.

10 Claims, 30 Drawing Sheets

(51) Int. Cl.
*G11B 27/10* (2006.01)
*G11B 27/32* (2006.01)
*H04N 9/82* (2006.01)
*H04N 21/262* (2011.01)
*H04N 9/87* (2006.01)
*G11B 20/10* (2006.01)
*H04N 5/85* (2006.01)
*H04N 9/804* (2006.01)
*H04N 9/806* (2006.01)

(52) U.S. Cl.
CPC ............ *G11B 2020/10537* (2013.01); *G11B 2020/10546* (2013.01); *H04N 5/85* (2013.01); *H04N 9/8042* (2013.01); *H04N 9/8063* (2013.01); *H04N 9/8205* (2013.01); *H04N 9/8227* (2013.01); *H04N 21/26258* (2013.01); *H04N 9/87* (2013.01)

(56) References Cited

U.S. PATENT DOCUMENTS

| | | | |
|---|---|---|---|
| 8,139,922 B2* | 3/2012 | Hattori et al. | 386/314 |
| 8,208,794 B2 | 6/2012 | Kobayashi et al. | |
| 8,340,496 B2* | 12/2012 | Iwase et al. | 386/239 |
| 8,351,767 B2 | 1/2013 | Iwase et al. | |
| 8,737,822 B2* | 5/2014 | Kato et al. | 386/353 |
| 2002/0135607 A1 | 9/2002 | Kato et al. | |
| 2002/0164152 A1 | 11/2002 | Kato et al. | |
| 2005/0196148 A1 | 9/2005 | Seo et al. | |
| 2010/0272126 A1 | 10/2010 | Hattori et al. | |
| 2013/0004140 A1 | 1/2013 | Iwase et al. | |

FOREIGN PATENT DOCUMENTS

WO WO 2004/114658 A1 12/2004
WO WO 2005/050528 6/2005

OTHER PUBLICATIONS

D.P. Kelly et al., "Blu-Ray Disc—A Versatile Format for Recording High Definition Video", XP-001193856, 2003 Digest of Technical Papers, IEEE, pp. 72-73.

Extended European Search Report issued Feb. 21, 2013 in Patent Application No. 12193275.0.

Extended European Search Report issued Feb. 21, 2013 in Patent Application No. 12193283.4.

Summons to Oral Proceedings dated Sep. 13, 2013, in European Patent Application No. 05710219.6.

* cited by examiner

FIG. 1
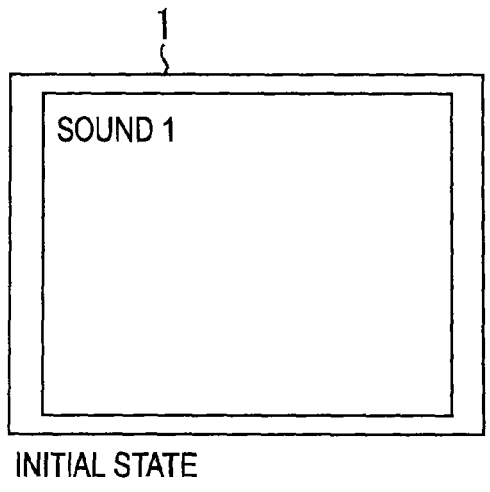
INITIAL STATE
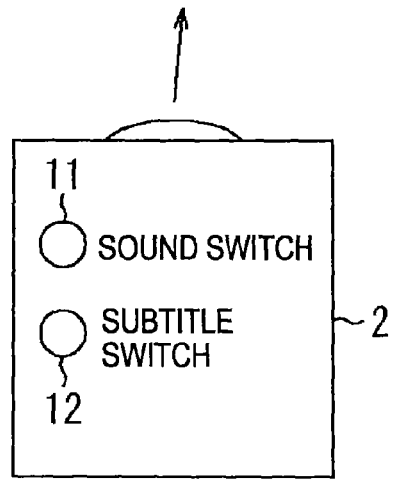
FIG. 2
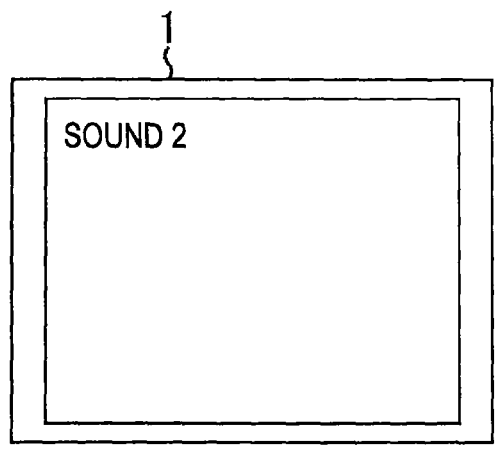

FIG. 4

STREAM NUMBER TABLE

A_SN=1: AUDIO 2
A_SN=2: AUDIO 1
A_SN=3: AUDIO 3

S_SN=1: SUB-PICTURE 3
S_SN=2: SUB-PICTURE 1
S_SN=3: SUB-PICTURE 2

FIG. 11

PlayList-Syntax

| Syntax | No. of bits | Mnemonic |
|---|---|---|
| PlayList() { | | |
|    length | 32 | uimsbf |
|    reserved_for_future_use | 16 | bslbf |
|    number_of_PlayItems | 16 | uimsbf |
|    number_of_SubPaths | 16 | uimsbf |
|    for (PlayItem_id=0; | | |
|       PlayItem_id<number_of_PlayItems; | | |
|       PlayItem_id++) { | | |
|          PlayItem() | | |
|    } | | |
|    for (SubPath_id= 0; | | |
|       SubPath_id<number_of_SubPaths; | | |
|       SubPath_id++) { | | |
|          SubPath() | | |
|    } | | |
| } | | |

FIG. 12

SubPath-Syntax

| Syntax | No. of bits | Mnemonic |
|---|---|---|
| SubPath() { | | |
| length | 32 | uimsbf |
| reserved_for_future_use | 8 | bslbf |
| SubPath_type | 8 | uimsbf |
| reserved_for_future_use | 15 | uimsbf |
| is_repeat_SubPath | 1 | bslbf |
| reserved_for_future_use | 8 | bslbf |
| number_of_SubPlayItems | 8 | uimsbf |
| for(i=0;i< number_of_SubPlayItems;i++) { | | |
| SubPlayItem(i) | | |
| } | | |
| } | | |

FIG. 13

SubPlayItem(i)-Syntax

| Syntax | No. of bits | Mnemonic |
|---|---|---|
| SubPlayItem(i) { | | |
| length | 16 | uimsbf |
| Clip_Information_file_name[0]           //subclip_entry_id=0 | 8*5 | bslbf |
| Clip_codec_identifier[0] | 8*4 | bslbf |
| reserved_for_future_use | 31 | bslbf |
| is_multi_Clip_entries | 1 | bslbf |
| ref_to_STC_id[0] | 8 | uimsbf |
| SubPlayItem_IN_time | 32 | uimsbf |
| SubPlayItem_OUT_time | 32 | uimsbf |
| sync_PlayItem_id | 16 | uimsbf |
| sync_start_PTS_of_PlayItem | 32 | uimsbf |
| if(is_multi_Clip_entries==1b) { | | |
| reserved_for_future_use | 8 | bslbf |
| num_of_Clip_entries | 8 | uimsbf |
| for(subclip_entry_id=1;//Note:Entries after subclip_entry_id=0 | | |
| subclip_entry_id<num_of_Clip_entries;subclip_entry_id ++) { | | |
| Clip_Information_file_name[subclip_entry_id] | 8*5 | bslbf |
| Clip_codec_identifier[subclip_entry_id] | 8*4 | bslbf |
| ref_to_STC_id[subclip_entry_id] | 8 | uimsbf |
| reserved_for_future_use | 8 | bslbf |
| } | | |
| } | | |
| } | | |

FIG. 14

PlayItem-Syntax

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     }else{ | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 15

| STN_table() Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0; | | |
|         video_stream_id < number_of_video_stream_entries; | | |
|         video_stream_id++) { | | |
|         stream_entry() | | |
|         stream_attribute() | | |
|     } | | |
|     for (audio_stream_id=0; | | |
|         audio_stream_id < number_of_audio_stream_entries; | | |
|         audio_stream_id++) { | | |
|         stream_entry() | | |
|         stream_attribute() | | |
|     } | | |
|     for (PG_textST_stream_id=0; | | |
|         PG_textST_stream_id < number_of_PG_textST_stream_entries; | | |
|         PG_txtST_stream_id++) { | | |
|         stream_entry() | | |
|         stream_attribute() | | |
|     } | | |
|     for (IG_stream_id=0; | | |
|         IG_stream_id < number_of_IG_stream_entries; | | |
|         IG_stream_id++) { | | |
|         stream_entry() | | |
|         stream_attribute() | | |
|     } | | |
| } | | |

FIG. 16

| Syntax | No. of bits | Mnemonic |
|---|---|---|
| stream_entry() { | | |
|     type | 8 | uimsbf |
|     reserved | 8 | bslbf |
|     if(type==1) { | | |
|         ref_to_stream_PID_of_mainClip | 16 | uimsbf |
|         reserved_for_future_use | 48 | bslbf |
|     }else if(type==2) { | | |
|         ref_to_SubPath_id | 8 | uimsbf |
|         reserved_for_future_use | 56 | bslbf |
|     }else if(type==3) { | | |
|         ref_to_SubPath_id | 8 | uimsbf |
|         ref_to_subClip_entry_id | 8 | uimsbf |
|         reserved_for_future_use | 48 | bslbf |
|     } | | |
|     }else if(type==4) { | | |
|         ref_to_SubPath_id | 8 | uimsbf |
|         ref_to_subClip_entry_id | 8 | uimsbf |
|         ref_to_stream_PID_of_subClip | 16 | uimsbf |
|         reserved_for_future_use | 32 | bslbf |
|     } | | |
| } | | |

FIG. 17 stream_attribute()

| Syntax | No. of bits | Mnemonic |
|---|---|---|
| stream_attribute() { | | |
|     length | 8 | uimsbf |
|     stream_coding_type | 8 | bslbf |
|     if (stream_coding_type==0x02) { | | |
|         video_format | 4 | bslbf |
|         frame_rate | 4 | bslbf |
|         aspect_ratio | 4 | bslbf |
|         reserved_for_future_use | 4 | bslbf |
|     } else if (stream_coding_type==0x80 \|\| <br>         stream_coding_type==0x81 \|\| <br>         stream_coding_type==0x82) { | | |
|         audio_presentation_type | 4 | bslbf |
|         sampling_frequency | 4 | bslbf |
|         audio_language_code | 8*2 | bslbf |
|         reserved_for_future_use | 8 | bslbf |
|     } else if (stream_coding_type==0x90) { <br>         // Presentation graphics stream | | |
|         PG_language_code | 8*2 | bslbf |
|     } else if (stream_coding_type==0x91) { <br>         // Interactive graphics stream | | |
|         IG_language_code | 8*2 | bslbf |
|     } else if (stream_coding_type==0x92) { <br>         // Text subtitle stream | | |
|         character_code | 8 | bslbf |
|         textST_language_code | 8*2 | bslbf |
|     } | | |
| } | | |

FIG. 18 stream_coding_type

| stream_coding_type | Meaning |
|---|---|
| 0x02 | MPEG-2 video stream |
| 0x80 | HDMV LPCM audio |
| 0x81 | Dolby AC-3 audio |
| 0x82 | dts audio |
| 0x90 | Presentation graphics stream |
| 0x91 | Interactive graphics stream |
| 0x92 | Text subtitle stream |
| other values | reserved |

FIG. 19 video_format

| video_format | Meaning | Video standard |
|---|---|---|
| 0 | reserved | |
| 1 | 480i | ITU-R BT.601-4 |
| 2 | 576i | ITU-R BT.601-4 |
| 3 | 480p | SMPTE 293M |
| 4 | 1080i | SMPTE 274M |
| 5 | 720p | SMPTE 296M |
| 6 | 1080p | SMPTE 274M |
| 7 - 14 | reserved | |

FIG. 20 frame_rate

| frame_rate | Meaning [Hz] |
|---|---|
| 0 | reserved |
| 1 | 24 000/1001 (23.976...) |
| 2 | 24 |
| 3 | 25 |
| 4 | 30 000/1001 (29.97...) |
| 5 | reserved |
| 6 | 50 |
| 7 | 60 000/1001 (59.94...) |
| 8-15 | reserved |

FIG. 21 aspect_ratio

| aspect_ratio | Meaning |
|---|---|
| 0 | reserved |
| 1 | reserved |
| 2 | 4:3 display aspect ratio |
| 3 | 16:9 display aspect ratio |
| 4-15 | reserved |

FIG. 22 audio_presentation_type

| audio_presentation_type | Meaning |
|---|---|
| 0 | reserved |
| 1 | single mono channel |
| 2 | dual mono channel |
| 3 | stereo (2-channel) |
| 4 | reserved |
| 5 | reserved |
| 6 | multi-channel |
| 7-15 | reserved |

FIG. 23 sampling_frequency

| sampling_frequency | Meaning |
|---|---|
| 0 | reserved |
| 1 | 48 kHz |
| 2 | reserved |
| 3 | reserved |
| 4 | 96 kHz |
| 5 -15 | reserved |

FIG. 24

| Character code value | Character set | Character Encoding scheme |
|---|---|---|
| 0x00 | reserved | |
| 0x01 | Unicode V1.1 (ISO 10646-1) | UTF8 |
| 0x02 | Unicode V1.1 (ISO 10646-1) | UTF16 big endian |
| 0x03 | Shift JIS (Japanese) | |
| 0x04 | KSC 5601-1987 including KSC 5653 for Roman character (Korean) | |
| 0x05 | GB18030-2000 (Chinese) | |
| 0x06 | GB2312 (Chinese) | |
| 0x07 | BIG5 (Chinese) | |
| Others | Reserved | |

FIG. 32A

PlayList

| Syntax | No. of bits | Mnemonic |
|---|---|---|
| PlayList() { | | |
|     length | 32 | uimsbf |
|     reserved_for_future_use | 16 | bslbf |
|     number_of_PlayItems | 16 | uimsbf |
|     for(PlayItem_id=0;<br>        PlayItem_id<number_of_PlayItems;<br>        PlayItem_id++) { | | |
|         PlayItem() | | |
|     } | | |
| } | | |

FIG. 32B

SubPaths

| Syntax | No. of bits | Mnemonic |
|---|---|---|
| SubPaths() { | | |
|     length | 32 | uimsbf |
|     reserved_for_future_use | 16 | bslbf |
|     number_of_SubPaths | 16 | uimsbf |
|     for (SubPath_id= 0;<br>        SubPath_id<number_of_SubPaths;<br>        SubPath_id++) { | | |
|         SubPath() | | |
|     } | | |
| } | | |

FIG. 33

| Syntax | No. of bits | Mnemonic |
|---|---|---|
| stream_entry() { | | |
|   length | 8 | uimsbf |
|   type | 8 | bslbf |
|   if (type==1) { | | |
|     ref_to_stream_PID_of_mainClip | 16 | uimsbf |
|     reserved_for_future_use | 48 | bslbf |
|   } else if (type==2) { | | |
|     ref_to_SubPath_id | 8 | uimsbf |
|     ref_to_subClip_entry_id | 8 | uimsbf |
|     ref_to_stream_PID_of_subClip | 16 | uimsbf |
|     reserved_for_future_use | 32 | bslbf |
|   } | | |
| } | | |

FIG. 34

| type | Meaning |
|---|---|
| 0 | reserved |
| 1 | Identify an elementary stream of the Clip used by the PlayItem. |
| 2 | Identify an elementary stream of the Clip used by a SubPath associated with the PlayItem. |
| others | reserved |

PLAYBACK APPARATUS, PLAYBACK METHOD, PROGRAM, RECORDING MEDIUM, AND DATA STRUCTURE

CROSS-REFERENCE TO RELATED APPLICATIONS

The present application is a continuation of U.S. application Ser. No. 10/580,647 filed May 25, 2006, and is based on JP 2004-038574 filed Feb. 16, 2004 and JP 2004-108650 filed Apr. 1, 2004, the entire contents of each of which are incorporated herein by reference.

TECHNICAL FIELD

The present invention relates to playback apparatuses, playback methods, programs, recording media, and data structures. More particularly, the invention relates to a playback apparatus, a playback method, a program, a recording medium, and a data structure that enable interactive operations when AV content is played back.

BACKGROUND ART

In DVD (Digital Versatile Disc) video standards, interactive operations can be performed, that is, users can switch sound or subtitles when playing back AV (Audio Visual) content, such as a movie, recorded on an information recording medium (for example, see Non-Patent Document 1). More specifically, the user operates a sound switch button 11 or a subtitle switch button 12 of a remote controller 2 to switch sound or subtitles of AV content displayed on a display device 1 shown in FIG. 1. For example, if the user operates the sound switch button 11 when sound 1 is set in the initial state in the display device 1, sound 1 is switched to sound 2, as shown in FIG. 2.

AV content on DVD video is recorded in the form of an MPEG (Moving Picture Experts Group) 2 program stream. In the MPEG2 program stream, as shown in FIG. 3, a video stream (Video in FIG. 3), a plurality of audio streams (indicated by Audio 1, 2, and 3 in FIG. 3), and a plurality of sub-picture streams (Sub-pictures 1, 2, and 3) are multiplexed such that the audio streams and the sub-picture streams are AV-synchronized with the video stream. The sub-picture streams (sub-pictures 1, 2, and 3) are streams in which bitmap images are run-length coded, and are mainly used for subtitles.

Generally, a plurality of audio streams are used for recording sound of different languages, and a plurality of sub-picture streams are used for recording subtitles of different languages. The user can interactively select sound or subtitles of a desired language by using the remote controller 2 while video is being played back.

The DVD video defines a table structure, provided to users, indicating the relationship between sound numbers and subtitle numbers for a plurality of audio streams (audio 1, 2, and 3) and a plurality of sub-picture streams (sub-pictures 1, 2, and 3) in a program stream.

FIG. 4 illustrates a stream number table indicating the relationship between audio signals and subtitle signals. In this table, the sound numbers are referred to as "A_SN (Audio Stream Number)", and the subtitle numbers are referred to as "S_SN (Sub-picture Stream Number)". In FIG. 4, each of the plurality of audio streams is provided with A_SN, and each of the plurality of sub-picture streams is provided with S_SN. More specifically, A_SN=1: audio 2, A_SN=2: audio 1, and A_SN-3: audio 3. Also, S_SN=1: sub-picture 3, S_SN=2: sub-picture 1, and S_SN=3: sub-picture 2. In this case, a smaller number of A_SN or S_SN indicates an audio signal or a subtitle signal to be provided to users with higher priority. That is, A_SN=1 is an audio stream played back as a default, and S_SN=1 is a sub-picture stream played back as a default.

More specifically, sound 1 played back in the initial state in FIG. 1 is audio 2, which is A_SN=1 (FIG. 4), and sound 2 played back after being switched from sound 1 in FIG. 2 is audio 1, which is ASN=2.

Non-Patent Document 1: DVD Specifications for Read-Only Disc Part 3; Version 1.1

DISCLOSURE OF INVENTION

Problems to be Solved by the Invention

According to the DVD video, however, when the user switches sound or subtitles while playing back a video program stream, the user can select only from audio streams or sub-picture streams multiplexed into the program stream which is currently played back. That is, when playing back an MPEG2 program stream, such as that shown in FIG. 3, the user can select only from audio 1 through audio 3 when switching sound.

Accordingly, even if another stream having audio streams and subtitles different from a program stream which is currently played back is available, the user cannot switch sound or subtitles to the audio streams or subtitles in the different stream. Accordingly, the extensibility in selecting streams is low.

The present invention has been made in view of the above background. An object of the present invention is to select sound and subtitles from streams or data files different from a main AV stream when the user switches sound or subtitles.

Means for Solving the Problems

A playback apparatus of the present invention includes: obtaining means for obtaining playback management information including first information having a main playback path indicating the position of an AV stream file recorded on a recording medium and second information having a plurality of sub playback paths indicating the positions of sub files including accompanying data to be played back simultaneously with playback of main image data included in the AV stream file; selection means for selecting accompanying data to be played back, based on an instruction from a user, from among accompanying data to be played back simultaneously with the main image data included in the AV stream file referred to by the main playback path and the accompanying data included in the sub files referred to by the sub playback paths; reading means for reading, if the accompanying data selected by the selection means is included in a sub file referred to by a sub playback path, the sub file referred to by the sub playback path together with the AV stream file referred to by the main playback path; and playback means for playing back the main image data included in the AV stream file read by the reading means and the accompanying data included in the sub file selected by the selection means and read by the reading means.

The first information may include a table defining the accompanying data included in the AV stream file referred to by the main playback path and the accompanying data referred to by the sub playback paths, and the selection means may select the accompanying data to be played back, based on the instruction from the user, from among the accompanying data defined in the table.

The playback apparatus may further include determining means for determining whether the playback apparatus has a function of playing back the accompanying data selected by the selection means. If it is determined by the determining means that the playback apparatus has a function of playing back the accompanying data and if the accompanying data is included in a sub file referred to by a sub playback path, the reading means may read the sub file referred to by the sub playback path together with the AV stream file referred to by the main playback path, and the playback means may play back the main image data included in the AV stream file read by the reading means and the accompanying data included in the sub file selected by the selection means and read by the reading means.

The playback apparatus may further include determining means for determining whether the playback apparatus has a function of playing back the accompanying data selected by the selection means. If it is determined by the determining means that the playback apparatus has a function of playing back the accompanying data and if the accompanying data is included in a sub file referred to by a sub playback path, the reading means may read the sub file referred to by the sub playback path together with the AV stream file referred to by the main playback path, and the playback means may play back the main image data included in the AV stream file read by the reading means and the accompanying data included in the sub file selected by the selection means and read by the reading means.

The table may further define accompanying information concerning accompanying data, and the determining means may determine whether the playback apparatus has a function of playing back the accompanying data based on attribute information concerning the accompanying data defined in the table.

The second information may include type information concerning the types of sub playback paths, file names of the sub files referred to by the sub playback paths, and IN points and OUT points of the sub files referred to by the sub playback paths.

The second information may further include specifying information for specifying the AV stream file referred to by the main playback path to play back the sub playback paths simultaneously with the main playback path, and a time on the main playback path for allowing the IN points to be started in synchronization with the main playback path on the time axis of the main playback path.

A playback method of the present invention includes: an obtaining step of obtaining playback management information including first information having a main playback path indicating the position of an AV stream file recorded on a recording medium and second information having a plurality of sub playback paths indicating positions of sub files including accompanying data to be played back simultaneously with playback of main image data included in the AV stream file; a selection step of selecting accompanying data to be played back, based on an instruction from a user, from among accompanying data to be played back simultaneously with the main image data included in the AV stream file referred to by the main playback path and the accompanying data included in the sub files referred to by the sub playback paths; a reading step of reading, if the accompanying data selected by processing of the selection step is included in a sub file referred to by a sub playback path, the sub file referred to by the sub playback path together with the AV stream file referred to by the main playback path; and a playback step of playing back the main image data included in the AV stream file read by processing of the reading step and the accompanying data included in the sub file selected by processing of the selection step and read by processing of the reading step.

A program of the present invention includes: an obtaining step of obtaining playback management information including first information having a main playback path indicating the position of an AV stream file recorded on a recording medium and second information having a plurality of sub playback paths indicating the positions of sub files including accompanying data to be played back simultaneously with playback of main image data included in the AV stream file; a selection step of selecting accompanying data to be played back, based on an instruction from a user, from among accompanying data to be played back simultaneously with the main image data included in the AV stream file referred to by the main playback path and the accompanying data included in the sub files referred to by the sub playback paths; a reading step of reading, if the accompanying data selected by processing of the selection step is included in a sub file referred to by a sub playback path, the sub file referred to by the sub playback path together with the AV stream file referred to by the main playback path; and a playback step of playing back the main image data included in the AV stream file read by processing of the reading step and the accompanying data included in the sub file selected by processing of the selection step and read by processing of the reading step.

According to a first aspect of the present invention, playback management information including first information having a main playback path indicating the position of an AV stream file recorded on a recording medium and second information having a plurality of sub playback paths indicating the positions of sub files including accompanying data to be played back simultaneously with playback of main image data included in the AV stream file is obtained. Then, accompanying data to be played back is selected, based on an instruction from a user, from among accompanying data to be played back simultaneously with the main image data included in the AV stream file referred to by the main playback path and the accompanying data included in the sub files referred to by the sub playback paths. If the selected accompanying data is included in a sub file referred to by a sub playback path, the sub file referred to by the sub playback path is read together with the AV stream file referred to by the main playback path. Then, main image data included in the read AV stream file and the accompanying data included in the selected and read sub file are played back.

Association data recorded on a first recording medium of the present invention indicates whether accompanying data is included in a clip used by a main playback path indicating the position of the AV stream file or in clips used by a plurality of sub playback paths indicating the positions of sub files including the accompanying data played back simultaneously with the AV stream file. If the association data indicates that the accompanying data is included in the clips used by the plurality of sub playback paths indicating the positions of the sub files including the accompanying data, the association data includes at least an ID of the sub playback path to be played back selected from the ID for specifying the sub playback path to be played back, an ID for specifying a clip used by the sub playback path, and an ID for specifying an elementary stream to be played back by the clip.

According to a second aspect of the present invention, the association data indicates whether accompanying data is included in a clip used by a main playback path indicating the position of the AV stream file or in clips used by a plurality of sub playback paths indicating the positions of sub files including the accompanying data played back simultaneously with the AV stream file. If the association data indicates that the accompanying data is included in the clips used by the plurality of sub playback paths indicating the positions of the sub files including the accompanying data, the association data includes at least an ID of the sub playback path to be played back selected from the ID for specifying the sub playback path to be played back, an ID for specifying a clip used by the sub playback path, and an ID for specifying an elementary stream to be played back by the clip.

A playback control file recorded on a second recording medium of the present invention includes a sub playback path indicating the position of a sub file including accompanying data to be played back simultaneously with main image data included in an AV stream file. The main playback path includes a table defining a list of elementary streams that are selectable while the main playback path is being played back. The table includes data indicating whether the selectable elementary streams are included in the AV stream file selected by the main playback path or the sub file selected by the sub playback path.

According to a data structure of the present invention, a playback control file includes a sub playback path indicating the position of a sub file including accompanying data to be played back simultaneously with main image data included in an AV stream file. The main playback path includes a table defining a list of elementary streams that are selectable while the main playback path is being played back. The table includes data indicating whether the selectable elementary streams are included in the AV stream file selected by the main playback path or the sub file selected by the sub playback path.

According to a third aspect of the present invention, a playback control file includes a sub playback path indicating the position of a sub file including accompanying data to be played back simultaneously with main image data included in an AV stream file. The main playback path includes a table defining a list of elementary streams that are selectable while the main playback path is being played back. The table includes data indicating whether the selectable elementary streams are included in the AV stream file selected by the main playback path or the sub file selected by the sub playback path.

Advantages

According to the present invention, interactive operations can be performed when playing back an AV stream file. In particular, according to the present invention, interactive operations can also be performed on sub files referred to by sub playback paths, which are different from the AV stream file referred to by the main playback path.

BRIEF DESCRIPTION OF THE DRAWINGS

FIG. 1 illustrates known sound switching.
FIG. 2 illustrates known sound switching.
FIG. 4 illustrates a stream number table indicating the relationship between sound signals and subtitle signals provided to a user.
FIG. 11 illustrates the syntax of PlayList( ).
FIG. 12 illustrates the syntax of SubPath( ).
FIG. 13 illustrates the syntax of SubPlayItem(i).
FIG. 14 illustrates the syntax of PlayItem( ).
FIG. 15 illustrates the syntax of STN_table( ).
FIG. 16 illustrates an example of the syntax of stream_entry( ).
FIG. 17 illustrates the syntax of stream_attribute( ).
FIG. 18 illustrates stream_cording_type.
FIG. 19 illustrates video_format.
FIG. 20 illustrates frame_rate.
FIG. 21 illustrates aspect_ratio.
FIG. 22 illustrates audio_presentation_type.
FIG. 23 illustrates sampling_frequency.
FIG. 24 illustrates Character code.
FIG. 32A illustrates another example of the syntax of PlayList( ).
FIG. 32B illustrates another example of the syntax of PlayList( ).
FIG. 33 illustrates another example of the syntax of STN_table( ).
FIG. 34 illustrates the types in STN_table( ) shown in FIG. 33.

Figure 3:
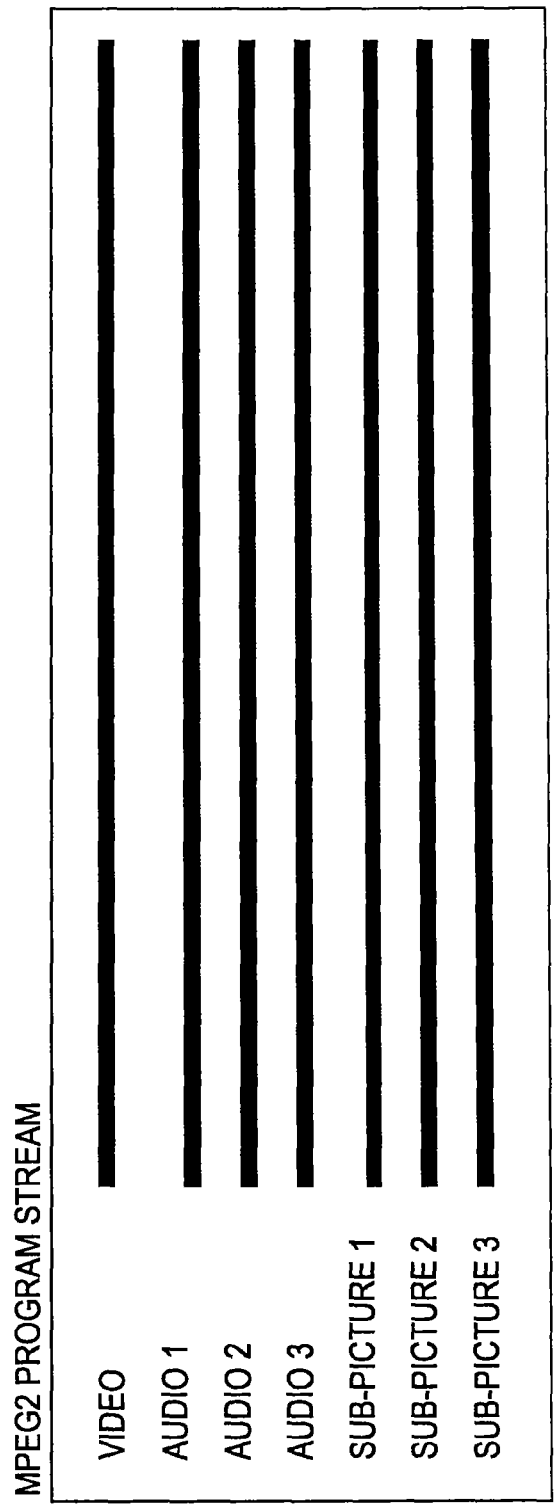
FIG. 3 illustrates the structure of an MPEG2 program stream.

REFERENCE NUMERALS 20 playback apparatus, 31 storage drive, 32 switch, 33 AV decoder, 34 controller, 51 through 54 buffers, 55, 56 PID filters, 57 through 59 switches, 71 background decoder, 72 MPEG2 video decoder, 73 presentation graphics decoder, 74 interactive graphics decoder, 75 audio decoder, 76 Text-ST composition, 77 switch, 91 background plane generator, 92 video plane generator, 93 presentation graphics plane generator, 94 interactive graphics plane generator, 95 buffer, 96 video data processor, 97 audio data processor

BEST MODE FOR CARRYING OUT THE INVENTION

An embodiment of the present invention is described below with reference to the accompanying drawings.

Figure 5:
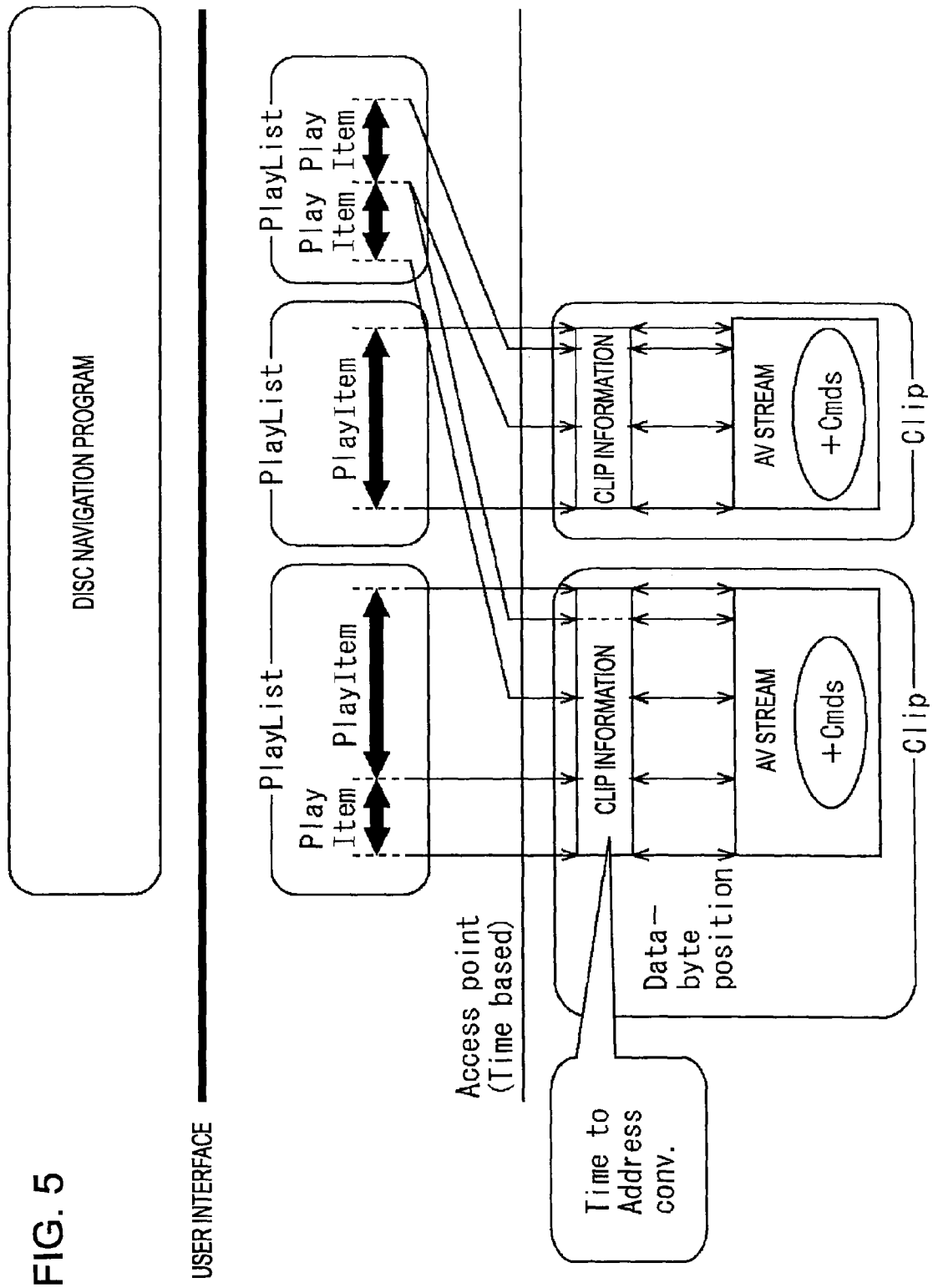
FIG. 5 illustrates an example of an application format on a recording medium installed in a playback apparatus to which the present invention is applied.

FIG. 5 illustrates an example of an application format on a recording medium to be installed in a playback apparatus 20 (which is discussed below with reference to FIG. 25) to which the present invention is applied. The recording medium may be an optical disc, a magnetic disk, or a semiconductor memory, which is discussed below.

The application format has two layers, i.e., PlayList and Clip, for managing AV (Audio Visual) streams. In this case, a pair of one AV stream and one item of clip information accompanying the AV stream are considered to be as one object, which is referred to as a "clip". An AV stream is also referred to as an "AV stream file". Clip information is also referred to as a "clip information file".

Generally, files used in computers are handled as byte strings. On the other hand, content of AV stream files is expanded onto a time axis, and access points in clips are mainly specified by PlayLists by using time stamps. That is, it can be said that PlayList and Clip form two layers for managing AV streams.

If access points in Clip are indicated by PlayList by using time stamps, a clip information file is used for finding, from the time stamps, information concerning an address at which decoding in an AV stream file is started.

PlayList is a set of playback zones of an AV stream. One playback zone in an AV stream is referred to as "PlayItem", which is indicated by a pair of an IN point (playback start point) and an OUT point (playback end point) on the time axis. Accordingly, PlayList has one or a plurality of PlayItems, as shown in FIG. 5.

In FIG. 5, the first PlayList from the left has two PlayItems, which refer to the first half and the second half of the AV stream contained in the clip at the left side in FIG. 5. The second PlayList from the left has one PlayItem, which refers to the entirety of the AV stream contained in the clip at the right side. The third PlayList from the left has two PlayItems, which refer to a certain portion of the AV stream contained in the clip at the left side and a certain portion of the AV stream contained in the clip at the right side.

If a disc navigation program shown in FIG. 5 designates the left PlayItem contained in the first PlayList from the left as information concerning the current playback position, the first half of the AV stream contained in the left clip, which is referred to by the designated PlayItem, is played back.

The disc navigation program has a function of controlling the playback order specified in PlayList and interactive playback operations by using PlayList. The disc navigation program also has a function of displaying a menu screen for allowing a user to give instructions to perform various types of playback operations. The disc navigation program is described in a programming language, for example, Java™, and is recorded on a recording medium.

In this embodiment, a playback path including at least one PlayItem (sequential PlayItems) in PlayList is referred to as a "Main Path", and a playback path including at least one Sub Path (formed by sequential or non-sequential SubPlayItems) disposed in parallel with the Main Path in a PlayList is referred to as a "Sub Path". That is, the application format on a recording medium installed in the playback apparatus 20 (which is discussed below with reference to FIG. 25) has at least one Sub Path, which is played back in association with the Main Path, in a PlayList.

Figure 6:
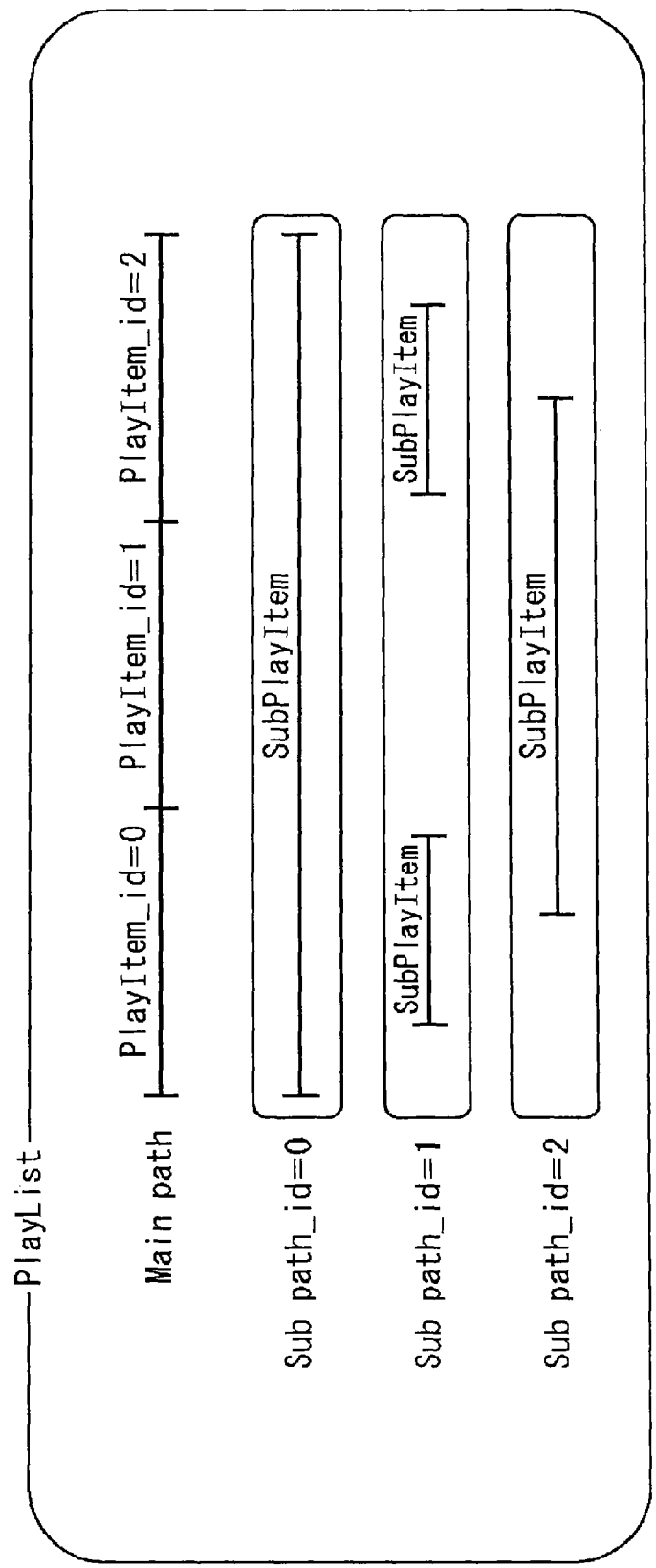
FIG. 6 illustrates the structure of Main Path and Sub Path.

FIG. 6 illustrates the structure of the Main Path and Sub Path. The PlayList is allowed to have the single Main Path and at least one Sub Path. One Sub Path includes at least one SubPlayItem.

The PlayList shown in FIG. 6 has one Main Path including three PlayItems and three Sub Paths. The PlayItems forming the Main Path are provided with IDs (Identifications) from the head. More specifically, the Main Path includes PlayItems, such as PlayItem_id=0, PlayItem_id=1, and PlayItem_id=2. The Sub Path are also provided with IDs from the head, such as Subpath_id=0, Subpath_id=1, and Sub Path_id=2. Subpath_id=0 has one SubPlayItem, Subpath_id=1 has two SubPlayItems, and Sub Path_id=2 has one SubPlayItem.

Sub Path_id=1 is applied to, for example, Director's Cut, and can be inserted into a predetermined portion of the AV stream file as the director's commentaries.

A clip AV stream file referred to by one PlayItem includes at least video stream data (main image data). The clip AV stream file may also include at least one audio stream, which is played back simultaneously with (in synchronization with) the video stream (main image data) which is also contained in the clip AV stream file. The clip AV stream file may also include at least one bitmap subtitle stream file which is played back in synchronization with the video stream which is also contained in the clip AV stream file. The clip AV stream file may also include at least one interactive graphics stream file which is played back in synchronization with the video stream which is also contained in the clip AV stream file. The video stream contained in the clip AV stream file and the audio stream, bitmap subtitle stream, or interactive graphics stream, which is played back in synchronization with the video stream, are multiplexed. In other words, a clip AV stream file referred to by one PlayItem includes video stream data and at least 0 audio stream data, at least 0 bitmap subtitle stream data, or at least 0 interactive graphics stream data, which is played back in synchronization with the video stream data, such that they are multiplexed into the clip AV stream file.

A SubPlayItem refers to, for example, audio stream data or subtitle data contained in a stream different from the clip AV stream file referred to by the PlayItem.

When playing back a PlayList including only a Main Path, the user can select sound and subtitles only from audio streams and sub-picture streams multiplexed into a clip referred to by that Main Path. In contrast, when playing back a PlayList including a Main Path and a Sub Path, the user can refer to audio streams and sub-picture streams multiplexed into a clip referred to by the SubPlayItem in addition to audio streams and sub-picture streams multiplexed into a clip AV stream file referred to by the Main Path.

As discussed above, a plurality of Sub Paths are included in one PlayList, and each SubPath refers to the corresponding SubPlayItem. Accordingly, AV streams having high extensibility and high flexibility can be provided. That is, SubPlayItems can be added afterwards.

Figure 7:
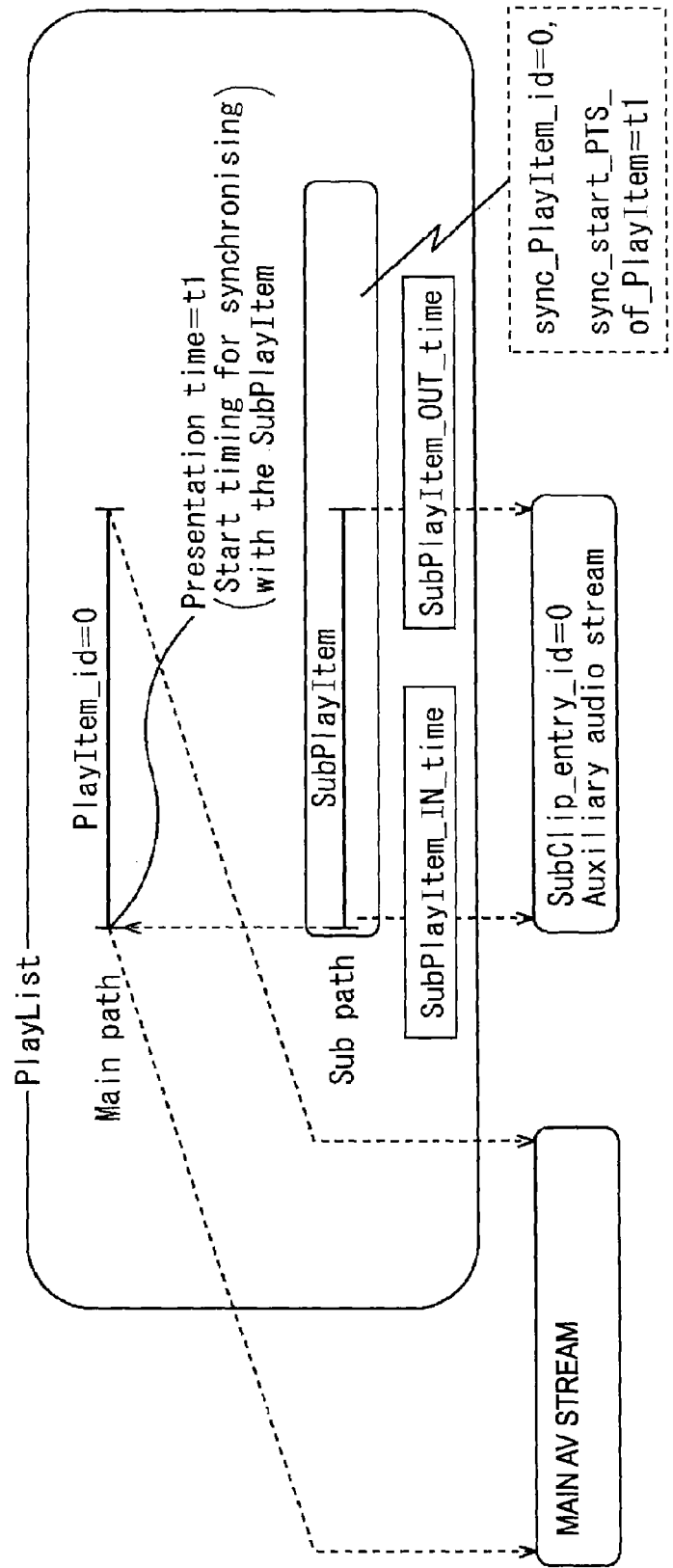
FIG. 7 illustrates an example of Main Path and Sub Path.

FIG. 7 illustrates an example of the Main Path and an example of the Sub Path. In FIG. 7, an audio playback path played back simultaneously with (in AV-synchronization with) the Main Path is indicated by using the Sub Path.

The PlayList shown in FIG. 7 includes one PlayItem, i.e., PlayItem_id=0, as the Main Path, and one SubPlayItem as the Sub Path. The SubPlayItem( ) includes the following data. SubPlayItem( ) includes Clip_Information_file_name for specifying the clip referred to by the Sub Path in the PlayList. In the example in FIG. 7, the SubPlayItem refers to an Auxiliary audio stream of SubClip_entry_id=0. SubPlayItem( ) also includes SubPlayItem_IN_time and SubPlayItem_OUT_time for specifying the playback zone of the Sub Path contained in the clip (in this case, the Auxiliary audio stream). The SubPlayItem( ) also includes sync_PlayItem_id and sync_start_PTS_of_PlayItem for specifying the time at which the playback operation of the Sub Path is started on the time axis of the Main Path. In FIG. 7, sync_PlayItem_id=0 and sync_start_PTS_of_PlayItem=t1. With this information, the time t1 at which the playback operation of the Sub Path is started on the time axis of PlayItem_id=0 of the Main Path can be specified. That is, in the example in FIG. 7, the playback start time of the Main Path and the playback start time of the Sub Path is the same, i.e., t1.

The clip AV audio stream referred to by the Sub Path should not include STC non-sequential points (system time base non-sequential points). The clip audio sample clock used for the Sub Path is locked to the audio sample clock used for the Main Path.

In other words, SubPlayItem( ) includes information for specifying the clip referred to by the Sub Path, information for specifying the playback zone of the Sub Path, and information for specifying the time at which the playback operation of the Sub Path is started on the time axis of the Main Path. Since the clip AV stream used for the Sub Path does not include STC, the user can refer to a clip AV audio stream different from the clip AV stream (main AV stream) referred to by the Main Path on the basis of the information included in SubPlayItem( ) (information for specifying the clip referred to by the Sub Path, information for specifying the playback zone of the Sub Path, and information for specifying the time at which the playback operation of the Sub Path is started on the time axis of the Main Path), and plays back the clip AV audio stream.

As stated above, the PlayItem and the SubPlayItem individually manage clip AV stream files. The clip AV stream file managed by the PlayItem is different from the clip AV stream file managed by the SubPlayItem.

In a manner similar to the example shown in FIG. 7, a subtitle stream playback path played back simultaneously with the Main Path may be indicated by using a Sub Path.

Figure 8:
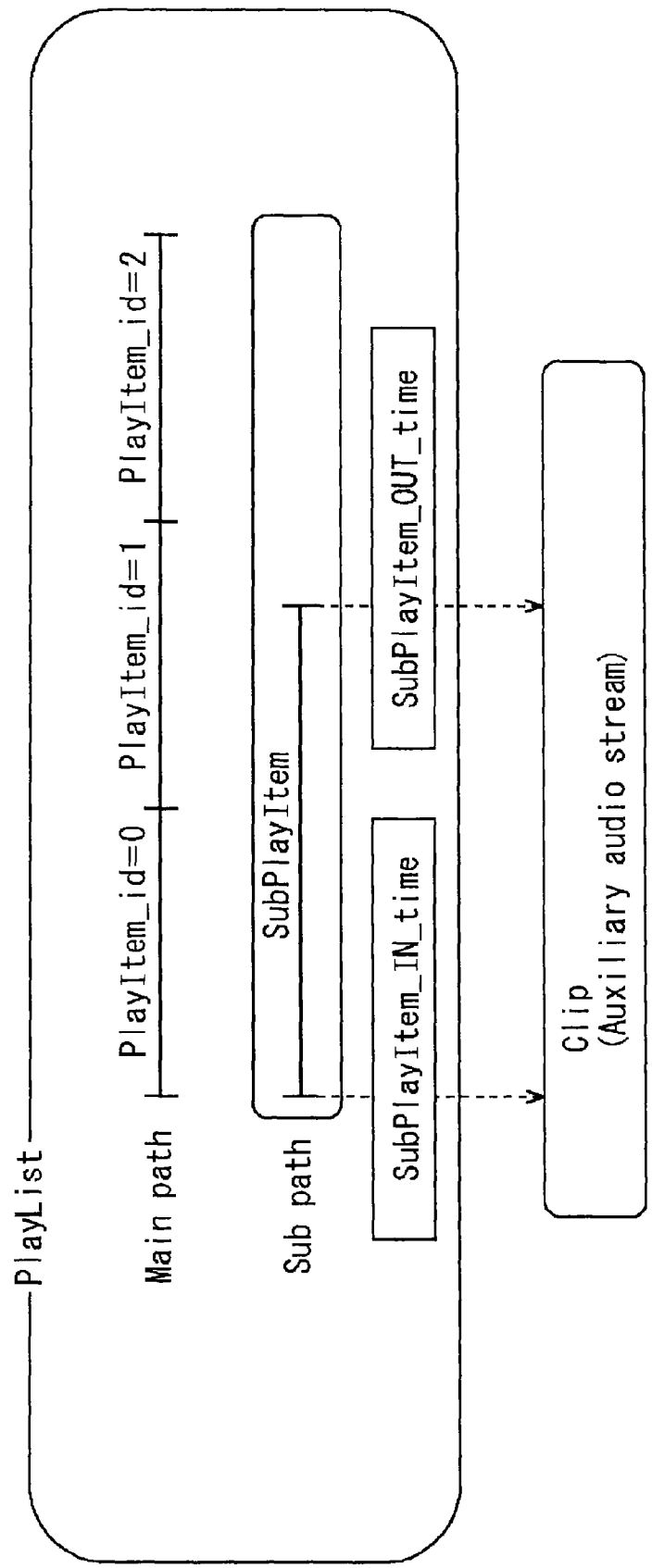
FIG. 8 illustrates another example of Main Path and Sub Path.

FIG. 8 illustrates another example of Main Path and another example of Sub Path. In FIG. 8, an audio playback path played back asynchronously with the Main Path is indicated by using a Sub Path. The main clip AV stream file referred to by the PlayItem of the Main Path is similar to that in FIG. 7, and an explanation thereof is thus omitted.

The configuration shown in FIG. 8 is used when, for example, the Main Path is used as the slideshow of still images and the audio path of the Sub Path is used as the BGM (background music) of the Main Path. That is, the configuration shown in FIG. 8 is used for allowing BGM to be continuously played back when the user instructs a playback apparatus (player) to update the images of the slideshow.

In FIG. 8, PlayItem_id=0, 1, and 2 are disposed in the Main Path, and one SubPlayItem is disposed in the Sub Path. The Sub Path includes SubPlayItem_IN_time and SubPlayItem_OUT_time for specifying the playback zone of the Sub Path in the clip (Auxiliary audio stream). In the example in FIG. 8, the clip (Auxiliary audio stream) is referred to by the SubPlayItem. By comparing FIG. 8 with FIG. 7, it can be understood that the SubPlayItem in FIG. 8 does not include sync_PlayItem_id and sync_start_PTS_of_PlayItem. The reason for this is that, since the playback timing of the AV stream (video data) referred to by the Main Path is not related to the audio playback timing, it is not necessary to specify the time at which the Sub Path starts the playback operation on the time axis of the Main Path. That is, information indicating that the AV stream referred to by the Main Path and the audio stream referred to by the Sub Path are played back together is sufficient.

It has been described that the playback timing of the video stream data included in the AV stream is different from that of the audio stream referred to by the Sub Path. To put it more specifically, this means that the playback timing of the video stream included in the AV stream is synchronous with that of the video stream (i.e., the audio stream is associated with the video stream), but a specific association, i.e., while a predetermined frame in the video stream is being played back, the corresponding sound is played back, is not given. More specifically, in the example shown in FIG. 7, the playback timing of the video stream is synchronous with that of the audio stream, and also, a specific association, i.e., while a predetermined frame in the video stream is being played back, the corresponding sound is played back, is given. In contrast, in the example shown in FIG. 8, although the playback timing of the video stream is synchronous with that of the audio stream, a specific association is not given, which means that, while a predetermined frame in the video stream is being played back, the corresponding sound is not played back.

Figure 9:
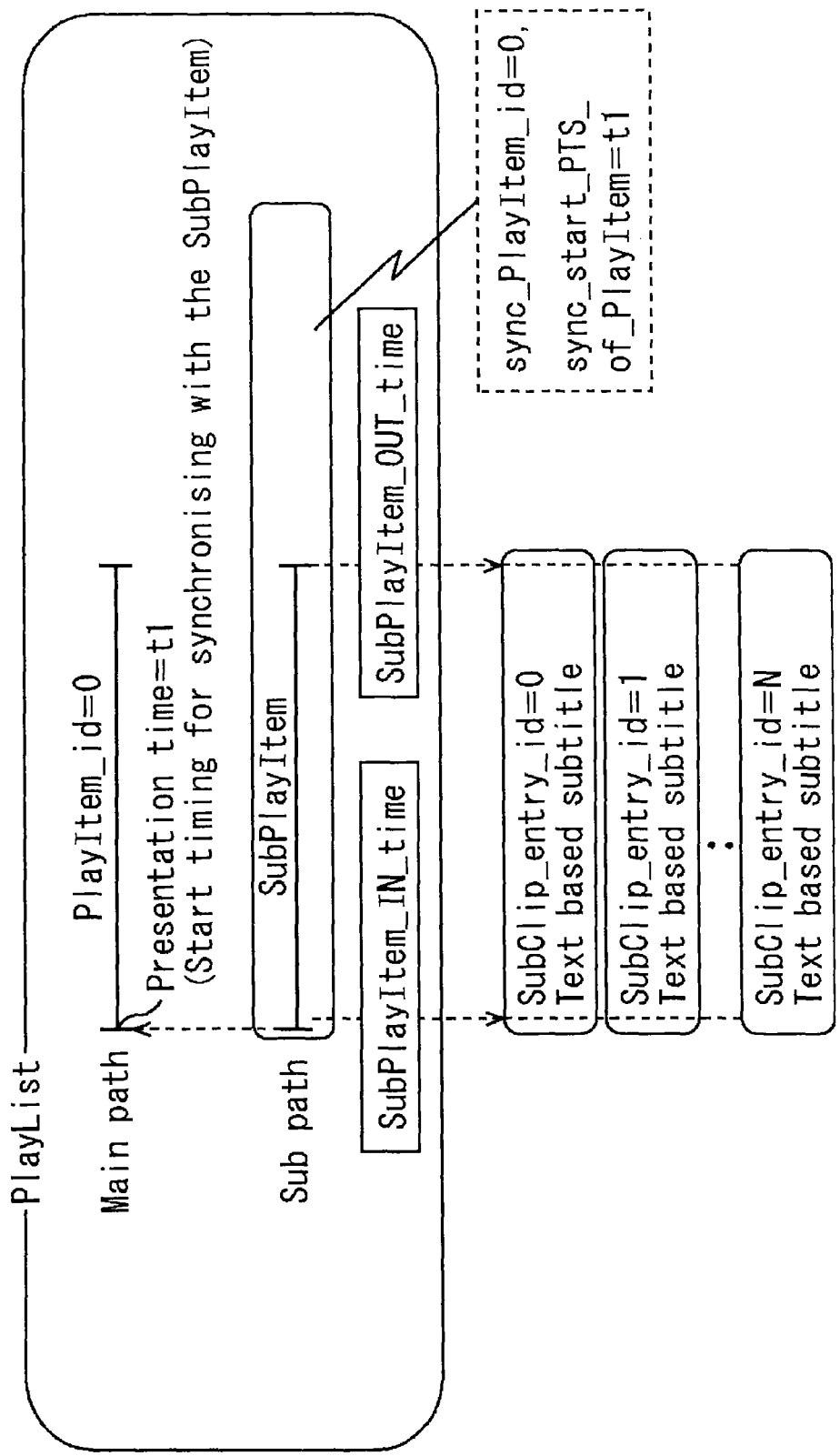
FIG. 9 illustrates still another example of Main Path and Sub Path.

FIG. 9 illustrates another example of the Main Path and the Sub Path. In FIG. 9, the playback path of text subtitles (interactive graphics stream) played back simultaneously with the Main Path is indicated by using a Sub Path. The main AV stream file referred to by the PlayItem of the Main Path is similar to that shown in FIG. 7, and an explanation thereof is thus omitted.

In this case, the text subtitles are defined as a multiplexed stream of an MPEG-2 system or as a data file, which is not a multiplexed stream. The data file is a file containing the text data of subtitles (character code string) to be played back in synchronization with the video of the Main Path and the attributes of the text data. The attributes are information concerning the font type, font size, and character color when the text data is subjected to rendering.

By comparing FIG. 9 with FIG. 7, it can be understood that the SubPlayItem can refer to the Text based subtitle (text subtitles) of SubClip_entry_id=0, 1, ..., N by the SubPlayItem. More specifically, according to the structure shown in FIG. 9, a plurality of text subtitle files can be simultaneously referred to by one SubPlayItem, and when playing back the SubPlayItem, one of the plurality of text subtitle files is selected and played back. For example, from among the text subtitles of a plurality of languages, one text subtitle file is selected and played back. More specifically, one SubClip_entry_id is selected from SubClip_entry_id=0 through N (based on a user's instruction), and the Text based subtitle referred to by the ID of the selected ID is played back.

Not only the text subtitle files, bitmap subtitle stream files, transport stream files, and various data files may be applicable to the example show in FIG. 9. Alternatively, data files including character codes and information for rendering the character codes may also applicable.

Figure 10:
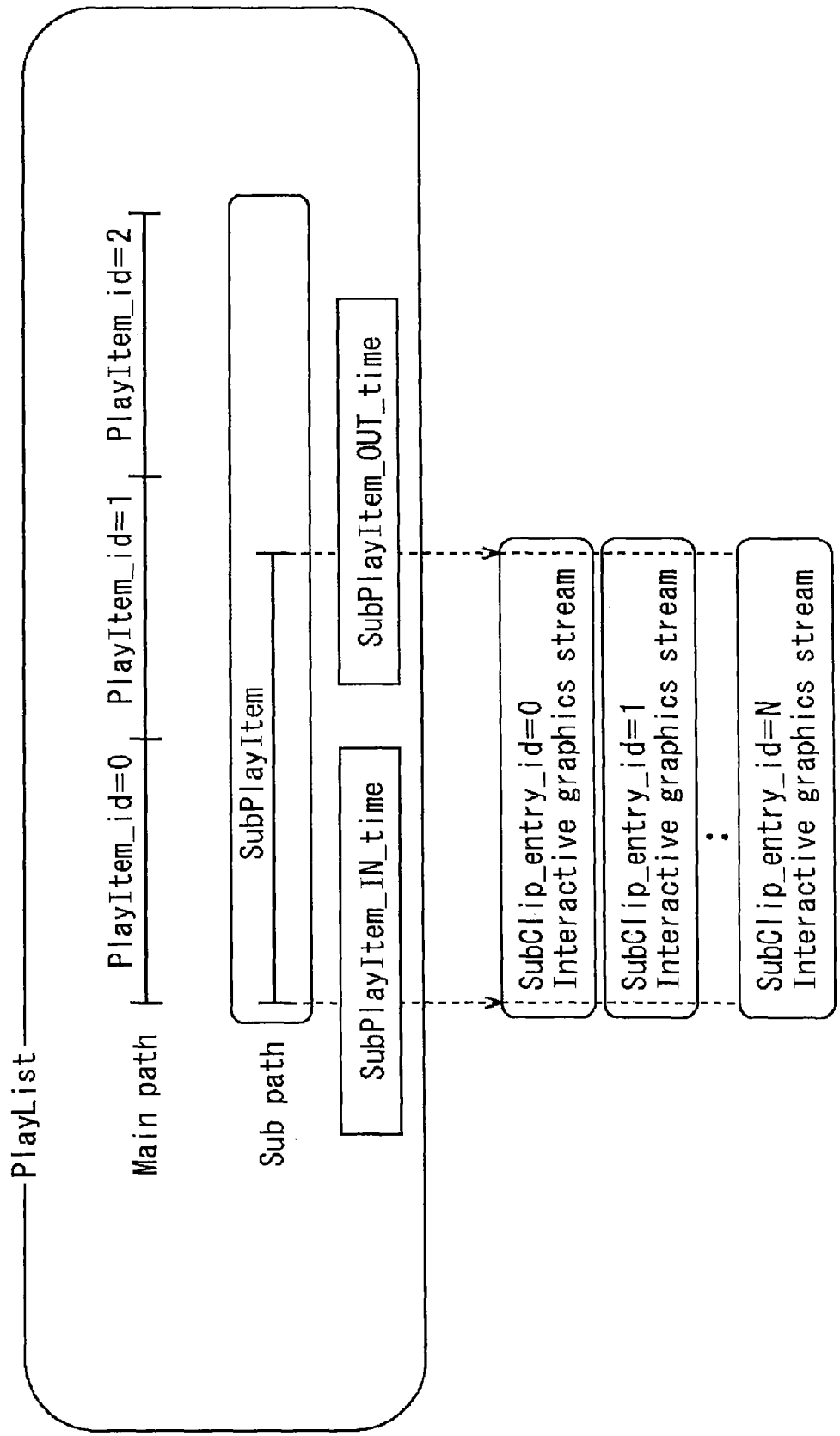
FIG. 10 illustrates another example of Main Path and Sub Path.

FIG. 10 illustrates another example of the Main Path and the Sub Path. In FIG. 10, the playback path of an interactive graphics stream played back asynchronously with the Main Path is indicated by using a Sub Path.

By comparing FIG. 10 with FIG. 8, it can be understood that the interactive graphics stream of SubClip_entry_id=0, 1, ..., N can be referred to by the SubPlayItem. That is, according to the structure in FIG. 10, one SubPlayItem can simultaneously refer to a plurality of interactive graphics stream files. When playing back the SubPlayItem, one interactive graphics stream file is selected and played back from the plurality of interactive graphics stream files. More specifically, from among SubClip_entry_id=0 through N, one SubClip_entry_id is selected (based on a user's instruction), and the interactive graphics stream referred to by the ID is played back. For example, based on the user's instruction, one language from the interactive graphics streams is selected, and the interactive graphics stream of the selected language is played back.

The data structure (syntax) that implements the structure of the Main Path and Sub Paths discussed with reference to FIGS. 6 through 10 is described below.

FIG. 11 illustrates the syntax of PlayList( ).

The "length" is a 32-bit unsigned integer indicating the number of bytes from immediately after the length field to the end of PlayList( ), i.e., a field indicating the number of bytes from reserved_for_future_use to the end of PlayList( ). After the "length", the 16-bit reserved_for_future_follows. The "number_of_PlayItems" is a 16-bit field indicating the number of play items contained in the PlayList. In the case of the example in FIG. 6, the number of PlayItems is three, and the numeric value is assigned to the PlayItems as PlayItem_id from 0 in the order in which PlayItem( ) appears in the playlist. For example, PlayItem_id=0, 1, 2 are assigned, as shown in FIG. 6, 8, or 10.

The number_of_SubPaths is a 16-bit field indicating the number of Sub Paths (number of entries) contained in the PlayList. In the case of the example in FIG. 6, the number of Sub Paths is three, and the numeric value is assigned to the SubPlayItems as SubPath_id from 0 in the order in which SubPath( ) appears in the playlist. For example, Sub Path_id=0, 1, 2 are assigned, as shown in FIG. 6. Then, in the subsequent FOR statement, the PlayItems are referred to for the same number of times as the number of PlayItems, and the Sub Paths are referred to for the same number of times as the number of Sub Paths.

As an alternative to the syntax of PlayList( ) shown in FIG. 11, the Syntax shown in FIG. 32 can be considered. In FIG. 11, the data structure SubPath( ) storing the information concerning the SubPath is contained in the PlayList( ). However, in FIG. 32, the data structure SubPath( ) is disposed independently of PlayList( ). In PlayList( ) shown in FIG. 32A, only PlayItems of Main Path are indicated, and in SubPaths( ) shown in FIG. 32B, Sub Path and SubPlayItems are indicated. According to the data structure shown in FIG. 32, SubPaths ( ) can be stored in a file different from the file storing PlayList( ). For example, the file storing SubPath( ) and a subtitle stream file or an audio stream file referred to by the SubPath can be downloaded from a network and can be played back together with the Main Path stored in a recording medium. That is, the extensibility of SubPath can be easily implemented. The file storing PlayList( ) and the file storing Sub-Paths( ) can be associated with each other by, for example, allowing part of the file names of the two files to be the same.

FIG. 12 illustrates the syntax of SubPath( ).

The "length" is a 32-bit unsigned integer indicating the number of bytes from immediately after the length field to the end of SubPath( ). After the "length", 16-bit reserved_for_future_use follows. The SubPath_type is an 8-bit field indicating the type of application of the SubPath. The SubPath_type is used for indicating, for example, the type of Sub Path, such as audio, bitmap subtitle, or text subtitle. That is, the Sub-Path_type indicates the types of Sub Paths shown in FIGS. 7 through 10. After the SubPath_type, 15-bit reserved_for_future_use follows. The is_repeat_SubPath is a one-bit field indicating the playback operation for the SubPath, and more specifically, indicating whether the SubPath is played back repeatedly or only once while playing back the Main Path. This field is used when, for example, the playback timing of the stream contained in the clip specified by the Sub Path is different from that of the main AV stream, as shown in FIG. 8 or 10. After is_repeat_SubPath, 8-bit reserved_for_future_use follows. The number_of_SubPlayItems is an 8-bit field indicating the number of SubPlayItems (number of entries) contained in one SubPath. For example, the number of SubPlayItems of SubPath_id=0 in FIG. 6 is one, and the number of SubPlayItems of Sub Path_id=1 is 2. In the subsequent FOR statement, SubPlayItems are referred to for the same number of times as the number of SubPlayItems.

FIG. 13 illustrates the syntax of SubPlayItem(i).

The "length" is a 16-bit unsigned integer indicating the number of bytes from immediately after the length field to the end of SubPlayItem( ).

In FIG. 13, the syntax is divided into two portions, and more specifically, a portion where the SubPlayItem refers to one clip and a portion where the SubPlayItem refers to a plurality of clips are shown.

The portion where the SubPlayItem refers to one clip is discussed first.

The SubPlayItem( ) includes Clip_Information_file_name [0] for specifying the clip. The SubPlayItem( ) also includes Clip_codec_identifier[0] for specifying the codec method for the clip, reserved_for_future_use, is_multi_Clip_entries, which is a flag indicating whether multi-clips are registered, and ref_to_STC_id[0], which is information concerning the STC non-sequential points (non-sequential points of the system time base). If the flag of is_multi_Clip_entries is ON, the syntax of the portion where SubPlayItem( ) refers to a plurality of clips is checked. The SubPlayItem( ) also includes SubPlayItem_IN_time and SubPlayItem_OUT_time for specifying the playback zone of the Sub Path contained in the clip, and sync_PlayItem_id and sync_start_PTS_of_PlayItem for specifying the playback start time at which the playback operation of the Sub Path is started on the time axis of the Main Path. The sync_PlayItem_id and sync_start_PTS_of_PlayItem are used when the playback timing of the main AV stream is the same as that of the stream contained in the file referred to by the Sub Path, as shown in FIGS. 7 and 9, but are not used for the cases shown in FIGS. 8 and 10 (when the playback timing of the main AV stream is different from the stream contained in the file referred to by the Sub Path). The SubPlayItem_IN_time, SubPlayItem_OUT_time, sync_PlayItem_id, and sync_start_PTS_of_PlayItem are used in common for the clip referred to by SubPlayItem.

Next, the portion where the SubPlayItem refers to a plurality of clips (if (is_multi_Clip_entries==1b) is discussed. More specifically, the case where SubPlayItem refers to a plurality of clips, as shown in FIG. 9 or 10.

The num_of_Clip_entries indicates the number of clips, and designates clips other than those having Clip_Information_file_name[0] [subClip_entry_id]. That is, num_of_Clip_entries designates clips, such as those having Clip_Information_file_name[1], Clip_Information_file_name[2], and so on, other than those having Clip_Information_file_name [0]. The SubPlayItem also includes Clip_codec_identifier [subClip_entry_id] for specifying the codec method for the clip, ref_to_STC_id[subClip_entry_id], which is information concerning the STC non-sequential points (non-sequential points of the system time base), and reserved_for_future_use.

The SubPlayItem_IN_time, SubPlayItem_OUT_time, sync_PlayItem_id, and sync_start_PTS_of_PlayItem are used in common for the clips referred to by SubPlayItem( ). In the example in FIG. 9, SubPlayItem_IN_time, SubPlayItem_OUT_time, sync_PlayItem_id, and sync_start_PTS_of_PlayItem are used in common for SubClip_entry_id=0 through N. The Text based subtitle for the selected SubClip_entry_id is played back based on the SubPlayItem_IN_time, SubPlayItem_OUT_time, sync_PlayItem_id, and sync_start_PTS_of_PlayItem.

The numeric value is sequentially assigned to SubClip_entry_id from 1 in the order in which Clip_Information_file_name[subClip_entry_id] in the SubPlayItem appears. The subClip_entry_id of Clip_Information_file_name [0] is 0.

FIG. 14 illustrates the syntax of PlayItem( ).

The "length" is a 16-bit unsigned integer indicating the number of bytes from immediately after the length field to the end of PlayItem( ). Clip_Information_file_name[0] is a field for specifying the clip referred to by PlayItem( ). In the example in FIG. 7, the main clip AV stream file is referred to by Clip_Information_file_name[0]. The PlayItem( ) also includes Clip_codec_identifier[0] specifying the codec method for the clip, reserved_for_future_use, is_multi_angle, connection_condition, and ref_to_STC_id[0], which is information concerning the STC non-sequential points (non-sequential points of the system time base). The PlayItem( ) also includes IN_time and OUT_time for specifying the playback zone of the play item in the clip. In the example in FIG. 7, IN_time and OUT_time specify the playback zone of the main clip AV stream file. The PlayItem( ) also includes UO_mask table( ), PlayItem_random access mode, and still_mode. A description of a case where is_multi_angle indicates a plurality of angles is not given here, since such a case is not directly related to the present invention.

The STN_table( ) in PlayItem( ) provides a mechanism for allowing a user, if the target PlayItem and at least one Sub Path to be played back in association with the target PlayItem are provided, to select from the streams contained in the clip referred to by the PlayItem and the clips referred to by at least one Sub Path when the user switches sound or subtitles.

FIG. 15 illustrates the syntax of STN_table( ). The STN_table( ) is set as an attribute of PlayItem.

The "length" is a 16-bit unsigned integer indicating the number of bytes from immediately after the length field to the end of STN_table( ). After the "length", 16-bit reserved_for_future_use follows. The number_of_video_stream_entries indicates the number of streams provided with video_stream_id entered (registered) in STN_table( ). The video_stream_id is information for identifying the video streams. The video_stream_number is the video stream number that can be seen by the user when switching video. The number_of_audio_stream_entries indicates the number of streams provided with audio_stream_id entered (registered) in STN_table( ). The audio_stream_id is information for identifying the audio streams. The audio_stream_number is the audio stream number that can be seen by the user when switching sound.

The number_of_PG_txtST_stream_entries indicates the number of streams provided with PG_txtST_stream_id entered in STN_table( ). In STN_table( ) shown in FIG. 15, streams (PG, Presentation Graphics streams) in which bitmap subtitles, such as DVD sub-pictures, are run-length coded, and text subtitle files (txtST) are entered. The PG_txtST_stream_id is information for identifying the subtitle streams, and PG_txtST_stream_number is the subtitle stream number (text subtitle stream number) that can be seen by the user when switching subtitles.

The num_of_IG_stream_entries indicates the number of streams provided with IG_stream_id entered in STN_table( ). In STN_table( ) shown in FIG. 15, interactive graphics streams are entered. The IG_stream_id is information for identifying the interactive graphics streams. The IG_stream_number is the graphics stream number that can be seen when switching graphics.

The syntax of stream_entry( ) is discussed below with reference to FIG. 16.

The "type" is an 8-bit field indicating the type of information required for uniquely specifying the stream provided with the above-described stream number.

If type=1, a packet ID (PID) is designated for specifying one elementary stream from a plurality of elementary streams multiplexed into the clip (Main Clip) referred to by the PlayItem. The ref_to_stream_PID_of_mainClip indicates this PID. That is, if type=1, the stream can be determined only by specifying the PID in the main clip AV stream file.

If type=2, when the SubPath refers to one clip in which only one elementary stream is multiplexed, the SubPath_id of the Sub Path is designated for specifying that elementary stream. The ref_to_SubPath_id indicates the Sub Path_id. Type=2 is used when only one audio stream is referred to by the Sub Path, as shown in FIG. 8, i.e., when the SubPlay Item contains only one clip.

If type=3, when SubPath refers to a plurality of clips at the same time and only one elementary stream is multiplexed in each clip, the SubPath_id and Clip id of the SubPath are designated for specifying the elementary stream of one clip (Sub Clip) referred to by the SubPath. The ref_to_SubPath_id indicates this SubPath_id, and ref_to_subClip_entry_id indicates this Clip id. Type=3 is used when one Sub Path refers to a plurality of clips (Text based Subtitles), as shown in FIG. 9, i.e., when SubPlayItem contains a plurality of clips.

If type=4, when SubPath refers to a plurality of clips at the same time and a plurality of elementary streams are multiplexed in each clip, the SubPath_id, Clip id, and packet ID (PID) of the SubPath are designated for specifying one of the plurality of elementary streams of one clip (Sub Clip) referred to by the SubPath. The ref_to_SubPath_id indicates this SubPath_id, ref_to_subClip_entry_id indicates this Clip id, and ref_to_stream_PID_of_subClip indicates this PID. Type=4 is used when a plurality of clips are referred to in the SubPlayItem and when a plurality of elementary streams are referred to by each clip.

When PlayItem and at least one SubPath played back in association with the PlayItem are provided, the use of types (type=1 through type=4) makes it possible to specify one elementary stream from the clip referred to by the PlayItem and the clips referred to by at least one SubPath. It should be noted that type=1 indicates the clip (main clip) referred to by the Main Path, and type=2 through 4 indicate the clip (sub clip) referred to by the Sub Path. In FIG. 16, four types are provided for specifying elementary streams. However, only two types, and more specifically, the type (type=1 in FIG. 16) for specifying the elementary stream multiplexed into the main clip and the type (types=2 through 4 in FIG. 16) for specifying the elementary stream of the clip used by the Sub Path, may be provided. The syntax of stream_entry( ) of such a case is described below with reference to FIG. 33.

In FIG. 33, the "type" is an 8-bit field indicating the type of information required for uniquely specifying the stream provided with the above-described stream number. More specifically, the 8-bit type field is used for designating the type of a database for specifying the elementary stream referred to by the stream number of stream_entry( ). In the example shown in FIG. 33, the type is divided into two types, as shown in FIG. 34. In FIG. 34, type=1 is the type (type=1 in FIG. 16) for specifying the elementary stream multiplexed into the main clip, and the type=2 is the type (types=2 through 4 in FIG. 16) for specifying the elementary stream of the clip used by the Sub Path.

Type=1 in FIG. 33 is used for specifying an elementary stream of the clip (main clip) used by the PlayItem. More specifically, when type=1, the packet ID (PID) is designated for specifying one of a plurality of elementary streams multiplexed into the clip (main clip) referred to by the PlayItem. The ref_to_stream_PID_of_mainClip indicates this PID. In other words, when type=1, the stream can be determined only by specifying the PID in the main clip AV stream file.

Type=2 in FIG. 33 is used for specifying the elementary stream of the clip used by the SubPath accompanying the PlayItem. In the case of type=2, for example, when the SubPath refers to one clip in which only one elementary stream is multiplexed (type=2 in FIG. 16), or when the SubPath refers to a plurality of clips at the same time and only one elementary stream is multiplexed in each clip (type=3 in FIG. 16), or when the SubPath refers to a plurality of clips at the same time and when a plurality of elementary streams are multiplexed in each clip (type=4 in FIG. 16), the SubPath_id, Clip id, and packet ID (PID) are designated for specifying the elementary stream.

Although in FIG. 33, when type=2, three IDs, such as SubPath_id, Clip id, and packet ID (PID), are specified, it is not necessary to specify all the three IDs. For example, when the SubPath refers to one clip in which only one elementary stream is multiplexed (type=2 in FIG. 16), it is sufficient if the SubPath_id of the SubPath is designated for specifying the elementary stream. When the SubPath refers to a plurality of clips at the same time and when only one elementary stream is multiplexed in each clip (type=3 in FIG. 16), it is sufficient if the SubPath_id and Clip id of the SubPath are designated for specifying the elementary stream of the clip (Sub Clip) referred to by the SubPath. When the SubPath refers to a plurality of clips at the same time and when a plurality of elementary streams are multiplexed in each clip (type=4 in FIG. 16), it is necessary that the SubPath_id, Clip id, and packet ID (PID) of the SubPath are designated for specifying one of the plurality of elementary streams of one clip (Sub Clip) referred to by the SubPath. That is, when type=2 in FIG. 33 or 34, among the SubPath_id, Clip id, and packet ID (PID), it is sufficient if at least Subpath_id is designated.

When the PlayItem and at least one SubPath played back in association with the PlayItem are provided, the use of types (types=1 and 2) makes it possible, as shown in FIGS. 33 and 34, to specify one elementary stream from the clip referred to by the PlayItem and clips referred to by at least one SubPath.

Referring back to a description of STN_table( ) in FIG. 15, in the FOR loop of the video stream ID (video_stream_id), video_stream_id is assigned from 0 to a video elementary stream specified for each stream_entry( ). Instead of the video stream ID (video_stream_id), the video stream number (video_stream_number) may be used, in which case, the video_stream_number is assigned from 1. That is, the number obtained by adding one to video_stream_id is the video stream number. The video stream number is assigned from 1 since video_stream_number is the video stream number that can be seen by the user when switching video.

Similarly, in the FOR loop of the audio stream ID (audio_stream_id), audio_stream_id is assigned from 0 to an audio elementary stream specified for each stream_entry( ). As in the video stream, instead of the audio stream ID (audio_stream_id), the audio stream number (audio_stream_number) may be used, in which case, the audio_stream_number is assigned from 1. That is, the number obtained by adding one to audio_stream_id is the audio_stream_number. The audio stream number is assigned from 1 since audio_stream_number is the audio stream number that can be seen by the user when switching sound.

Similarly, in the FOR loop of the subtitle stream ID (PG_txtST_stream_id), PG_txtST_stream_id is assigned from 0 to a bitmap subtitle or text subtitle elementary stream specified for each stream_entry( ). As in the video stream, instead of the subtitle stream ID (PGtxtST_stream_id), the subtitle stream number (PG_txtST_stream_number) may be used, in which case, the PG_txtST_stream_number is assigned from 1. That is, the number obtained by adding one to PG_txtST_stream_id is the PG_txtST_stream_number. The subtitle stream number is assigned from 1 since PG_txtST_stream_number is the text subtitle stream number that can be seen by the user when switching subtitles.

Similarly, in the FOR loop of the graphics stream ID (IG_stream_id), IG_stream_id is assigned from 0 to an interactive graphics elementary stream specified for each stream_entry( ). As in the video stream, instead of the graphics stream ID (IG_stream_id), the graphics stream number (IG_stream_number) may be used, in which case, the IG_stream_number is assigned from 1. That is, the number obtained by adding one to IG_stream_id is the IG_stream_number. The IG_stream_number is assigned from 1 since IG_stream_number is the graphics stream number that can be seen by the user when switching graphics.

The stream_attribute( ) in the STN_table( ) shown in FIG. 15 is as follows.

The stream_attribute( ) in the FOR loop of the video stream ID (video_stream_id) provides stream attribute information concerning one video elementary stream specified by each stream_entry( ). That is, in stream_attribute( ), stream attribute information concerning one video elementary stream specified by each stream_entry( ) is indicated.

Similarly, the stream attributes( ) in the FOR loop of the audio stream ID (audio_stream_id) provides stream attribute information concerning at least one audio elementary stream specified by each stream_entry( ). That is, in stream_attribute( ), stream attribute information concerning at least one audio elementary stream specified by each stream_entry( ) is indicated.

Similarly, the stream_attribute( ) in the FOR loop of the subtitle stream ID (PG_txtST_stream_id) provides stream attribute information concerning one bitmap subtitle elementary stream or one text subtitle elementary stream specified by each stream_entry( ). That is, in stream_attribute( ), stream attribute information concerning one bitmap subtitle elementary stream specified by each stream_entry( ) is indicated.

Similarly, the stream_attribute( ) in the FOR loop of the graphics stream ID (IG_stream_id) provides stream attribute information concerning one interactive graphics elementary stream specified by each stream_entry( ). That is, in stream_attribute( ), stream attribute information concerning one interactive graphics elementary stream specified by each stream_entry( ) is indicated.

The syntax of stream_attribute( ) is discussed below with reference to FIG. 17.

The "length" is a 16-bit unsigned integer indicating the number of bytes from the length field to the end of stream_attribute( ).

The stream_coding_type indicates the coding type of elementary stream, as shown in FIG. 18. The coding types of elementary streams include MPEG-2 video stream, HDMV LPCM audio, Dolby AC-3 audio, dts audio, Presentation graphics stream, Interactive graphics stream, and Text subtitle stream.

The video_format indicates the video format of a video elementary stream, as shown in FIG. 19. The video formats of the video elementary streams include 480i, 576i, 480p, 1080i, 720p, and 1080p.

The frame_rate indicates the frame rate of a video elementary stream, as shown in FIG. 20. The frame rates of the video elementary streams include 24000/1001, 24, 25, 30000/1001, 50, and 60000/1001.

The aspect_ratio indicates the aspect ratio of a video elementary stream, as shown in FIG. 21. The aspect ratios of the video elementary streams include 4:3 display aspect ratio and 16:9 display aspect ratio.

The audio_presentation_type indicates the presentation type of an audio elementary stream, as shown in FIG. 22. The presentation types of audio elementary streams include single mono channel, dual mono channel, stereo (2-channel), and multi-channel.

The sampling_frequency indicates the sampling frequency of an audio elementary stream, as shown in FIG. 23. The sampling frequencies of the audio elementary streams include 48 kHz and 96 kHz.

The audio_language_code indicates the language code (for example, Japanese, Korean, or Chinese) of an audio elementary stream.

The PG_language_code indicates the language code (for example, Japanese, Korean, or Chinese) of a bitmap subtitle elementary stream.

The IG_language_code indicates the language code (for example, Japanese, Korean, or Chinese) of an interactive graphics elementary stream.

The textST_language_code indicates the language code (for example, Japanese, Korean, or Chinese) of a text subtitle elementary stream.

The character_code indicates the character code of a text subtitle elementary stream, as shown in FIG. 24. The character codes of text subtitle elementary streams include Unicode V1.1 (ISO 10646-1), Shift JIS (Japanese), KSC 5601-1987 including KSC 5653 for Roman character (Korean), GB18030-2000 (Chinese), GB2312 (Chinese), and BIG5 (Chinese).

The syntax of stream_attribute( ) shown in FIG. 17 is specifically described below with reference to FIGS. 17, and 18 through 24.

If the coding type (stream_coding_type in FIG. 17) of the elementary stream is the MPEG-2 video stream (FIG. 18), stream_attribute( ) includes the video format (FIG. 19), the frame rate (FIG. 20), and the aspect ratio (FIG. 21) of the elementary stream.

If the coding type (stream_coding_type in FIG. 17) of the elementary stream is the HDMV LPCM audio, Dolby AC-3 audio, or dts audio (FIG. 18), stream_attribute( ) includes the audio presentation type (FIG. 22), the sampling frequency (FIG. 23), and the language code of the audio elementary stream.

If the coding type (stream_coding_type in FIG. 17) of the elementary stream is the Presentation graphics stream (FIG. 18), stream_attribute( ) includes the language code of the bitmap subtitle elementary stream.

If the coding type (stream_coding_type in FIG. 17) of the elementary stream is the Interactive graphics stream (FIG. 18), stream_attribute( ) includes the language code of the interactive graphics elementary stream.

If the coding type (stream_coding_type in FIG. 17) of the elementary stream is the Text subtitle stream (FIG. 18), stream_attribute( ) includes the character code (FIG. 24) and the language code of the text subtitle elementary stream.

The attribute information is not restricted to the above-described types.

In this manner, if PlayItem and at least one Sub Path played back in association with the PlayItem are provided, by referring to the clip referred to by the PlayItem and clips referred to by at least one Sub Path, attribute information concerning an elementary stream specified by stream_entry( ) can be defined by stream_attribute( ).

By checking the attribute information (stream_attribute( ), the playback apparatus can determine whether it has a function of playing back the corresponding elementary stream. Also, by checking the attribute information, the playback apparatus can select the elementary streams in accordance with the initial information concerning the language set in the playback apparatus.

It is now assumed, for example, that the playback apparatus has a function of playing back bitmap subtitle elementary streams without a function of playing back text subtitle elementary streams. In this case, in response to an instruction to switch the languages from the user, the playback apparatus sequentially selects only bitmap subtitle elementary streams from the FOR loop of the subtitle stream ID (PG_txtST_stream_id) and plays back the selected elementary streams.

If the initial information concerning the language set in the playback apparatus is Japanese, in response to an instruction to switch sound from the user, the playback apparatus sequentially selects only audio elementary stream whose language code is Japanese from the FOR loop of the audio stream ID (Audio_stream_id) and plays back the selected elementary streams.

As described above, by the provision of STN_table( ) in PlayItem( ), if PlayItem and at least one Sub Path played back in association with the PlayItem are provided, the user can select a stream to be played back from the clip referred to by the PlayItem and clips referred to by at least one Sub Path when switching sound or subtitles. Thus, interactive operations can be performed for streams or data files different from a main AV stream to be played back.

Since one PlayList includes a plurality of Sub Paths and each Sub Path refers to a SubPlayItem, AV streams having high extensibility and high flexibility are implemented. That is, SubPlayItems can be added afterwards. For example, if Playlist including a clip AV stream file referred to by the Main Path is replaced by PlayList including the clip AV stream file and a new Sub Path, the user can refer to, based on the new playlist, not only the clip AV stream file referred to by the Main Path, but also clip AV stream files different from the clip AV stream file referred to by the Main Path. Thus, the AV streams have high extensibility.

Figure 25:
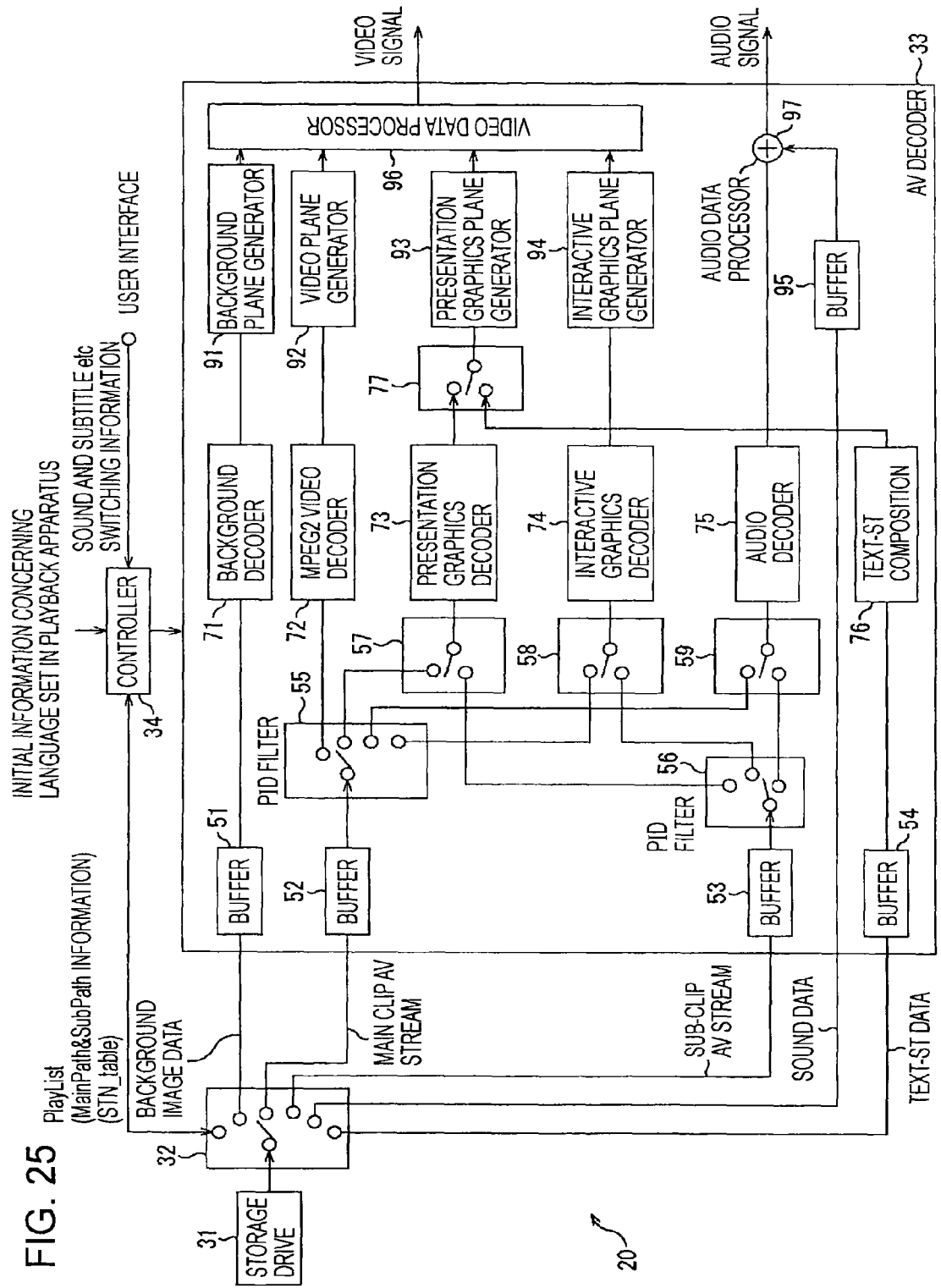
FIG. 25 is a block diagram illustrating an example of the configuration of a playback apparatus to which the present invention is applied.

A playback apparatus to which the present invention is applied is described below. FIG. 25 is a block diagram illustrating an example of the configuration of the playback apparatus 20 to which the present invention is applied. The playback apparatus 20 is the playback apparatus 20 for playing back Playlist including the above-described Main Path and Sub Path.

The playback apparatus 20 includes a storage drive 31, a switch 32, an AV decoder 33, and a controller 34.

In the example shown in FIG. 25, the controller 34 first reads out a PlayList file from the storage drive 31, and reads an AV stream or AV data from a recording medium, such as an HDD, Blu-ray disc, or DVD, via the storage drive 31 on the basis of the information concerning the PlayList file. The user can give an instruction to switch sound or subtitles to the controller 34 by using a user interface. The controller 34 reads initial information concerning the language set in the playback apparatus 20 from a storage unit (not shown).

The PlayList file includes, not only information concerning Main Path and Sub Path, but also STN_table( ). The controller 34 reads a main clip AV stream file (hereinafter referred to as a "main clip") referred to by PlayItem contained in the PlayList file, a sub clip AV stream file (hereinafter referred to as a "sub clip") referred to by SubPlayItem, and text subtitle data referred to by SubPlayItem from a recording medium via the storage drive 31. The controller 34 controls the playback apparatus 20 to select and play back elementary streams in accordance with the playback function of the playback apparatus 20 or to select and play back elementary streams in accordance with the initial information concerning the language set in the playback apparatus 20.

The AV decoder 33 includes buffers 51 through 54, PID filters 55 and 56, switches 57 through 59, a background decoder 71, an MPEG (Moving Picture Experts Group) 2 video decoder 72, a presentation graphics decoder 73, an interactive graphics decoder 74, an audio decoder 75, a Text-ST composition 76, a switch 77, a background plane generator 91, a video plane generator 92, a presentation graphics plane generator 93, an interactive graphics plane generator 94, a buffer 95, a video data processor 96, and an audio data processor 97.

File data read by the controller 34 is demodulated by a demodulator, and the demodulated multiplexed streams are then subjected to error correction by an ECC decoder. The switch 32 then divides the multiplexed streams subjected to error correction according to the stream types and supplies the divided streams to the corresponding buffers 51 through 54 under the control of the controller 34. More specifically, under the control of the controller 34, the switch 32 supplies background image data to the buffer 51, main clip data to the buffer 52, sub clip data to the buffer 53, and text-ST data to the buffer 54. Then, the buffers 51 through 54 buffer the background image data, main clip data, sub clip data, and text-ST data, respectively, therein.

The main clip is a stream (for example, a transport stream) in which at least one stream of video, audio, bitmap subtitle (presentation graphics stream), and interactive graphics streams is multiplexed together with a video stream. The sub clip is a stream in which at least one stream of audio, bitmap subtitle (presentation graphics stream), and interactive graphics streams is multiplexed. The data of the text subtitle data file (Text-ST) may be a multiplexed stream, such as a transport stream, but this is not essential.

When reading the main clip, the sub clip, and the text subtitle data from the storage drive 31 (recording medium), they can be alternately read in a time-division manner. Alternatively, the sub clip or the text subtitle data may be entirely preloaded to the buffer (buffer 53 or 54), respectively, before reading the main clip.

The playback apparatus 20 reads those file data from a recording medium via the storage drive 31 to play back video, bitmap subtitle, interactive graphics, and audio.

More specifically, stream data read out from the buffer 52, which serves as the main clip read buffer, is output to the PID (packet ID) filter 55, which is disposed subsequent to the buffer 52, at a predetermined time. The PID filter 55 allocates streams contained in the main clip to the corresponding elementary stream decoders, which are disposed subsequent to the PID filter 55, according to the PIDs (packet IDs). More specifically, the PID filter 55 supplies video streams to the MPEG2 video decoder 72, presentation graphics streams to the switch 57, which supplies the graphics streams to the presentation graphics decoder 73, interactive graphics streams to the switch 58, which supplies the graphics streams to the interactive graphics decoder 74, and audio streams to the switch 59, which supplies the audio streams to the audio decoder 75.

The presentation graphics streams are, for example, bitmap subtitle data, and the text subtitle data is, for example, text subtitle data.

Stream data read out from the buffer 53, which serves as the sub clip read buffer, is output to the PID (packet ID) filter 56, which is disposed subsequent to the buffer 53, at a predetermined time. The PID filter 56 allocates streams contained in the sub clip to the corresponding elementary stream decoders, which are disposed subsequent to the PID filter 56, according to the PIDs (packet IDs). More specifically, the PID filter 56 supplies presentation graphics streams to the switch 57, which supplies the graphics streams to the presentation graphics decoder 73, interactive graphics streams to the switch 58, which supplies the graphics streams to the interactive graphics decoder 74, and audio streams to the switch 59, which supplies the audio streams to the audio decoder 75.

Data read out from the buffer 51, which serves as the background image data buffer, is supplied to the background decoder 71 at a predetermined time. The background decoder 71 decodes the background image data, and then supplies the decoded data to the background plane generator 91.

The video streams allocated by the PID filter 55 are supplied to the video decoder 72, which is disposed subsequent to the PID filter 55. The video decoder 72 decodes the video streams and supplies the decoded video streams to the video plane generator 92.

The switch 57 selects one of the presentation graphics streams contained in the main clip supplied from the PID filter 55 and the presentation graphics streams contained in the sub clip supplied from the PID filter 56, and supplies the selected presentation graphics streams to the presentation graphics decoder 73, which is disposed subsequent to the switch 57. The presentation graphics decoder 73 decodes the presentation graphics streams and supplies them to the switch 77, which further supplies them to the presentation graphics plane generator 93.

The switch 58 selects one of the interactive graphics streams contained in the main clip supplied from the PID filter 55 and the interactive graphics streams contained in the sub clip, and supplies the selected interactive graphics streams to the interactive graphics stream decoder 74, which is disposed subsequent to the switch 58. That is, the interactive graphics streams simultaneously input into the interactive graphics decoder 74 are streams separated from the main clip or the sub clip. The interactive graphics decoder 74 decodes the interactive graphics streams, and supplies the decoded streams to the interactive graphics plane generator 94.

The switch 59 selects one of the audio streams contained in the main clip supplied from the PID filter 55 and the audio streams contained in the sub clip and supplies the selected audio streams to the audio decoder 75, which is disposed subsequent to the switch 59. That is, the audio streams simultaneously input into the audio decoder 75 are streams separated from the main clip or the sub clip. The audio decoder 75 decodes the audio stream and supplies the decoded audio stream to the audio data processor 97.

Sound data selected by the switch 32 is supplied to the buffer 95 and is buffered therein. The buffer 95 supplies the sound data to the audio data processor 97 at a predetermined time. The sound data is, for example, effect sound that can be selected from a menu.

Data read from the buffer 54, which serves as the text subtitle read buffer, is output to the text subtitle composition (decoder) 76, which is disposed subsequent to the buffer 54, at a predetermined time. The text subtitle composition 76 decodes the text-ST data and supplies the decoded data to the switch 77.

The switch 77 selects one of the presentation graphics streams decoded by the presentation graphics decoder 73 and the Text-ST (text subtitle data), and supplies the selected data to the presentation graphics plane generator 93. That is, subtitle images simultaneously supplied to the presentation graphics plane generator 93 are those output from the presentation graphics decoder 73 or from the text subtitle (Text-ST) composition 76. Presentation graphics streams simultaneously input into the presentation graphics decoder 73 are streams separated from the main clip or from the sub clip (selected by the switch 57). Accordingly, the subtitle images simultaneously input into the presentation graphics plane generator 93 are presentation graphics streams from the main clip, presentation graphics streams from a sub clip or text subtitle data.

The background plane generator 91 generates a background plane, which serves as, for example, a wallpaper image when a video image is displayed by reducing the size thereof, on the basis of the background image data supplied from the background decoder 71, and supplies the generated background plane to the video data processor 96. The video plane generator 92 generates a video plane based on the video data supplied from the MPEG2 video decoder 72, and supplies the generated video plane to the video data processor 96. The presentation graphics plane generator 93 generates a presentation graphics plane, which serves as, for example, a rendering image, on the basis of the data (presentation graphics streams or text subtitle data) selected by the switch 77, and supplies the generated presentation graphics plane to the video data processor 96. The interactive graphics plane generator 94 generates an interactive graphics plane based on the interactive graphics stream data supplied from the interactive graphics decoder 74, and supplies the generated interactive graphics plane to the video data processor 96.

The video data processor 96 combines the background plane from the background plane generator 91, the video plane from the video plane generator 92, the presentation graphics plane from the presentation graphics plane generator 93, and the interactive graphics plane from the interactive graphics plane generator 94, and outputs the combined plane as a video signal. The audio data processor 97 combines the audio data from the audio decoder 75 with the sound data from the buffer 95, and outputs the combined data as an audio signal.

The switches 57 through 59 and the switch 77 select data according to the selection by the user via the user interface or depending on the type of file containing target data. For example, if audio streams are contained only in sub-clip AV stream files, the switch 59 changes the selection to the sub clip side.

The playback processing performed by the playback apparatus 20 shown in FIG. 25 is described below with reference to the flowcharts in FIGS. 26 through 28. This processing is started when an instruction to play back a predetermined AV stream is given by a user via a user interface.

In step S11, the controller 34 reads a PlayList file recorded on a recording medium or a HDD (Hard Disk Drive) (not shown) via the storage drive 31. For example, the PlayList file discussed with reference to FIG. 11 is read.

In step S12, the controller 34 reads a main clip, a sub clip, and text subtitle data (text-ST data). More specifically, the controller 34 reads the corresponding main clip based on the PlayItem contained in the PlayList discussed with reference to FIG. 11. The controller 34 also reads a sub clip and text subtitle data based on the SubPlayItem discussed with reference to FIGS. 12 and 13, which is referred to by the SubPath contained in the PlayList.

In step S13, the controller 34 controls the switch 32 to supply the read data (main clip, sub clip, and text subtitle data) to the corresponding buffers 51 through 54. More specifically, the controller 34 controls the switch 32 to supply the background image data to the buffer 51, the main clip data to the buffer 52, the sub clip data to the buffer 53, and the Text-ST data to the buffer 54.

In step S14, the switch 32 is changed under the control of the controller 34. Then, the background data is supplied to the buffer 51, the main clip data is supplied to the buffer 52, the sub clip data is supplied to the buffer 53, and the text subtitle data is supplied to the buffer 54.

In step S15, the buffers 51 through 54 buffer the supplied data therein. More specifically, the buffer 51 buffers the background image data, the buffer 52 buffers the main clip data, the buffer 53 buffers the sub clip data, and the buffer 54 buffers the Text-ST data.

In step S16, the buffer 51 outputs the background image data to the background decoder 71.

In step S17, the buffer 52 outputs the main clip stream data to the PID filter 55.

In step S18, the PID filter 55 allocates the elementary streams to the corresponding elementary stream decoders based on the PIDs attached to the TS packets forming the main clip AV stream file. More specifically, the PID filter 55 supplies video streams to the MPEG2 video decoder 72, presentation graphics streams to the switch 57, which supplies the streams to the presentation graphics decoder 73, interactive graphics streams to the switch 58, which supplies the streams to the interactive graphics decoder 74, and audio streams to the switch 59, which supplies the streams to the audio decoder 75. That is, the video streams, presentation graphics streams, interactive graphics streams, and audio streams are provided with different PIDs.

In step S19, the buffer 53 outputs the sub clip stream data to the PID filter 56.

In step S20, the PID filter 56 allocates the elementary streams to the corresponding decoders based on the PIDs. More specifically, the PID filter 56 supplies presentation graphics streams to the switch 57, which supplies the streams to the presentation graphics decoder 73, interactive graphics streams to the switch 58, which supplies the streams to the interactive graphics decoder 74, and audio streams to the switch 59, which supplies the streams to the audio decoder 75.

In step S21, the switches 57 through 59, which are disposed subsequent to the PID filters 55 and 56, select one of the main clip and the sub clip under the control of the controller 34 via the user interface. More specifically, the switch 57 selects presentation graphics streams of the main clip or those of the sub clip supplied from the PID filter 55, and supplies the selected streams to the presentation graphics decoder 73, which is disposed subsequent to the switch 57. The switch 58 selects interactive graphics streams of the main clip or those of the sub clip supplied from the PID filter 55, and supplies the selected streams to the interactive graphics decoder 74, which is disposed subsequent to the switch 58. The switch 59 selects audio streams of the main clip or those of the sub clip supplied from the PID filter 55, and supplies the selected streams to the audio decoder 75, which is disposed subsequent to the switch 59.

In step S22, the buffer 54 outputs text subtitle data to the text subtitle composition 76.

In step S23, the background decoder 71 decodes background image data and supplies the decoded data to the background plane generator 91.

In step S24, the MPEG2 video decoder 72 decodes the video streams and supplies the decoded streams to the video plane generator 92.

In step S25, the presentation graphics decoder 73 decodes the presentation graphics streams selected by the switch 57, and outputs the decoded streams to the switch 77, which is disposed subsequent to the presentation graphics decoder 73.

In step S26, the interactive graphics decoder 74 decodes the supplied interactive graphics streams selected by the switch 58, and outputs the decoded streams to the interactive graphics plane generator 94, which is disposed subsequent to the interactive graphics decoder 74.

In step S27, the audio decoder 75 decodes the supplied audio data selected by the switch 59 and outputs the decoded data to the audio data processor 97, which is disposed subsequent to the audio decoder 75.

In step S28, the Text-ST composition 76 decodes text subtitle data and outputs the decoded data to the switch 77, which is disposed subsequent to the Text-ST composition 76.

In step S29, the switch 77 selects data from the presentation graphics decoder 73 or the Text-ST composition 76. More specifically, the switch 77 selects the presentation graphics streams decoded by the presentation graphics decoder 73 or the Test-ST (text subtitle data) from the Text-ST composition 76, and supplies the selected data to the presentation graphics plane generator 93.

In step S30, the background plane generator 91 generates a background plane based on the background image data supplied from the background decoder 71.

In step S31, the video plane generator 92 generates a video plane based on the video data supplied from the MPEG2 video decoder 72.

In step S32, the presentation graphics plane generator 93 generates a presentation graphics plane based on the data selected by the switch 77 and supplied from the presentation graphics decoder 73 or the Text-ST composition 76 in step S29.

In step S33, the interactive graphics plane generator 94 generates an interactive graphics plane based on the interactive graphics stream data supplied from the interactive graphics decoder 74.

In step S34, the buffer 95 buffers the sound data selected and supplied in step S14 and supplies it to the audio data processor 97 at a predetermined time.

In step S35, the video data processor 97 combines the planes and outputs the combined data. More specifically, the video data processor 97 combines the data from the background plane generator 91, the video plane generator 92, the presentation graphics plane generator 93, and the interactive graphics plane generator 94, and outputs the combined data as video data.

In step S36, the audio data processor 97 combines the audio data with the sound data, and outputs the resulting data.

Figure 26:
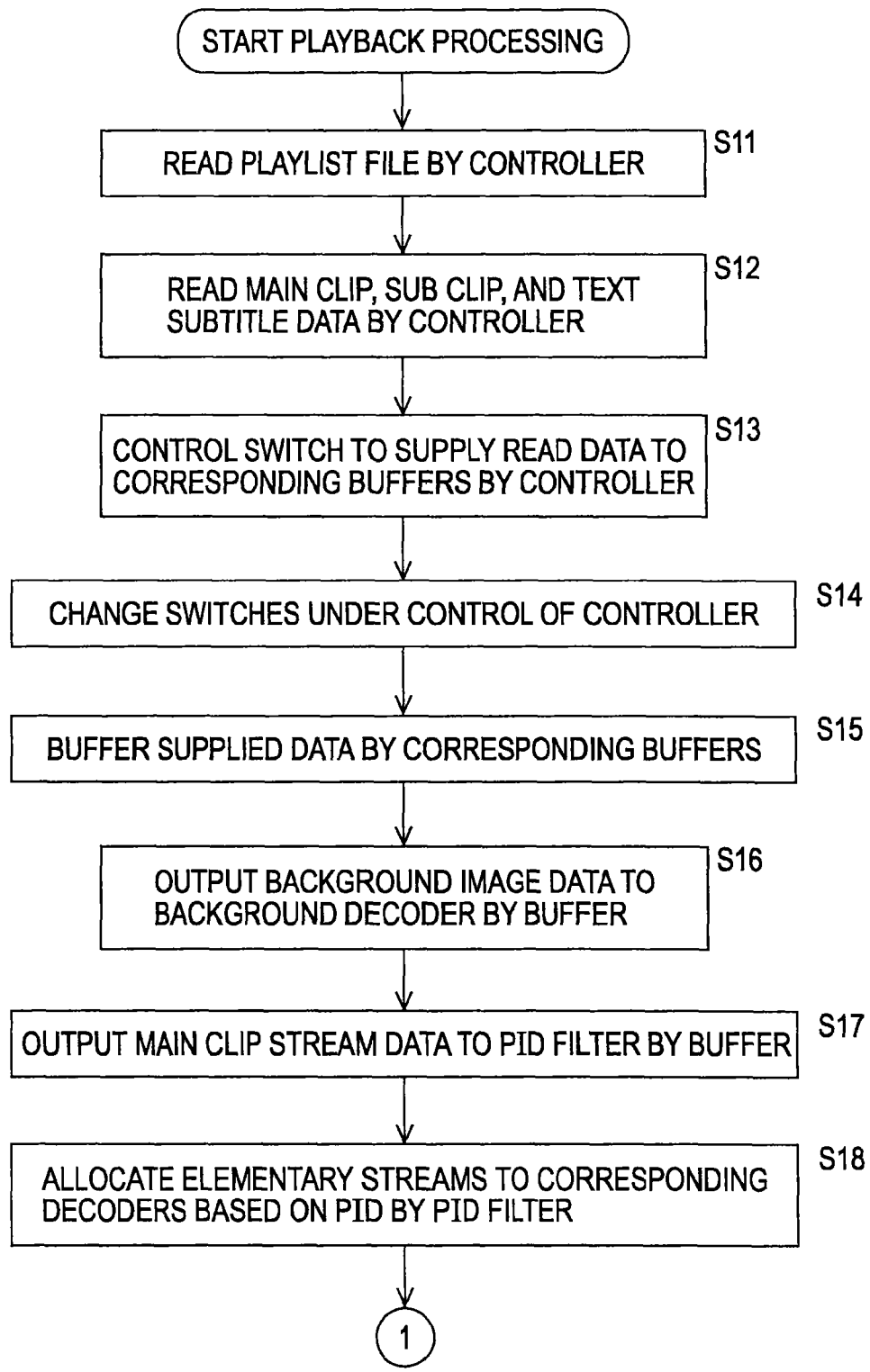
FIG. 26 is a flowchart illustrating playback processing performed by the playback apparatus shown in FIG. 25.
Figure 27:
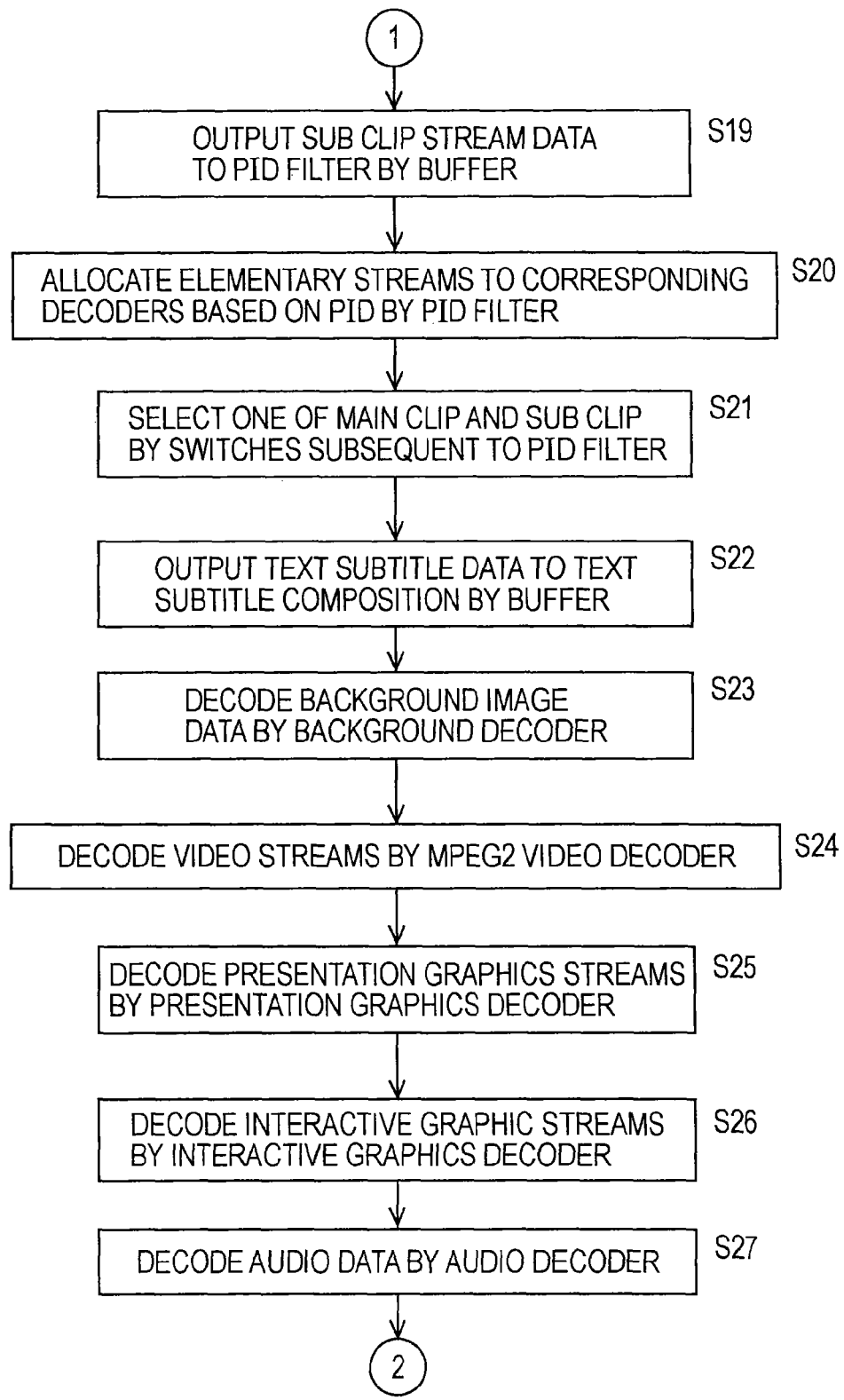
FIG. 27 is a flowchart illustrating the playback processing performed by the playback apparatus shown in FIG. 25.
Figure 28:
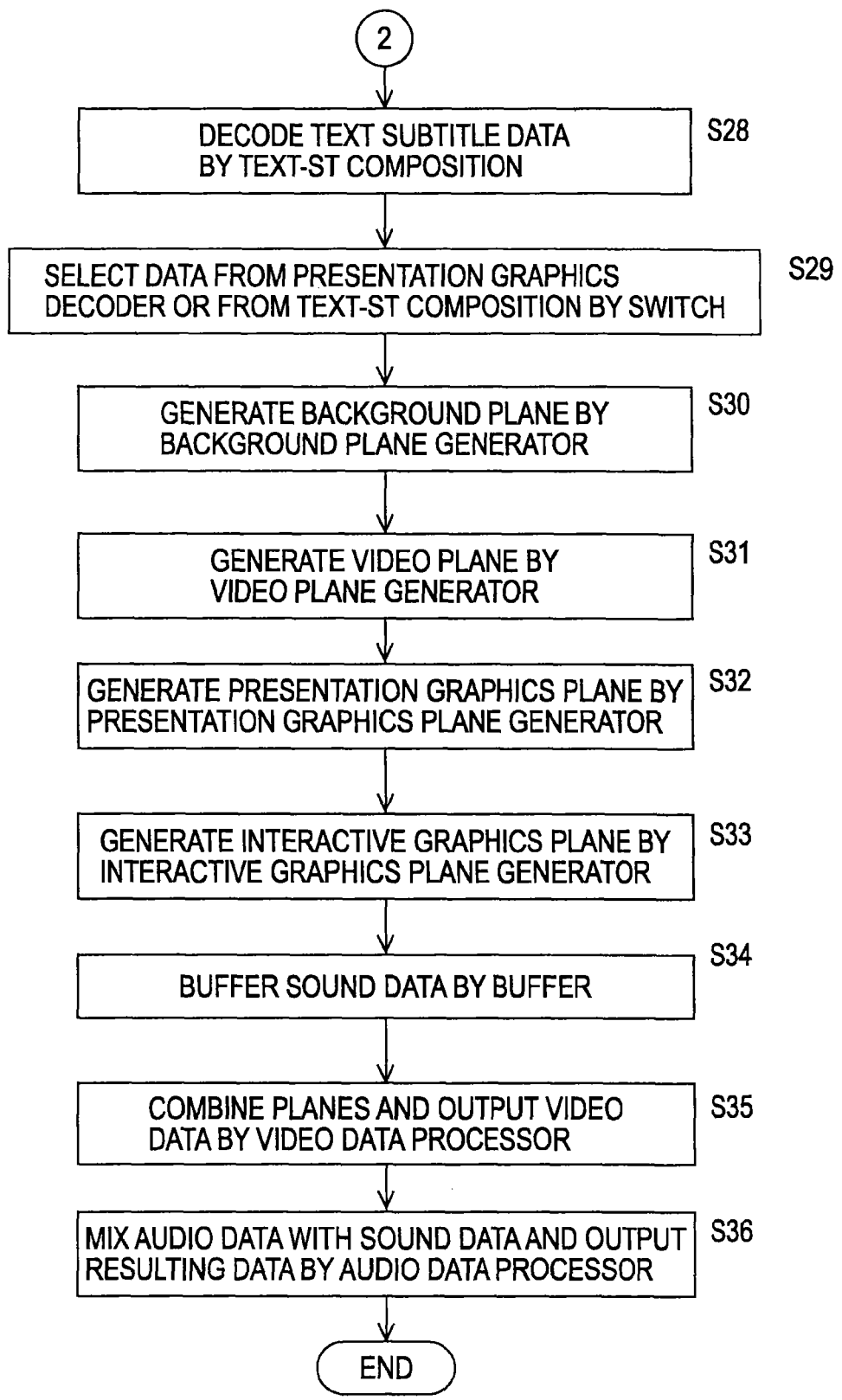
FIG. 28 is a flowchart illustrating the playback processing performed by the playback apparatus shown in FIG. 25.

According to the processing shown in FIGS. 26 through 28, by referring to the main clip referred to by the main path included in the PlayList, a sub clip referred to by the corresponding Sub Path included in the PlayList, and the text subtitle data, the corresponding data is played back. By providing the Main Path and the Sub Path in the PlayList, a clip AV stream file, which is different from the main clip AV stream file specified by the Main Path, can be specified by the Sub Path. Thus, sub clip data, which is different from the main clip specified by the PlayItem of the Main Path, can be played back together with (in synchronization with) the main clip data contained in the main clip.

In FIGS. 26 through 28, the order of steps S16 and S17 may be reversed or steps S16 and S17 may be executed in parallel. Similarly, the order of steps S18 and S20 may be reversed or steps S18 and S20 may be executed in parallel. The order of steps S23 through S28 may be reversed or steps S23 through S28 may be executed in parallel. The order of steps S30 through S33 may be reversed or steps S30 through S33 may be executed in parallel. The order of steps S35 and S36 may be reversed or steps S35 and S36 may be executed in parallel. That is, in FIG. 25, the elements disposed vertically on the same layer, i.e., the processing jobs of the buffers 51 through 54, those of the switches 57 through 59, those of the decoders 71 through 76, those of the plane generators 91 through 94, and those of the video data processor 96 and the audio data processor 97 may be executed in parallel, and the order thereof is not particularly restricted.

Processing performed by the playback apparatus 20 when an instruction to switch sound or subtitles is given is now described with reference to the flowchart in FIGS. 29 and 30.

Figure 29:
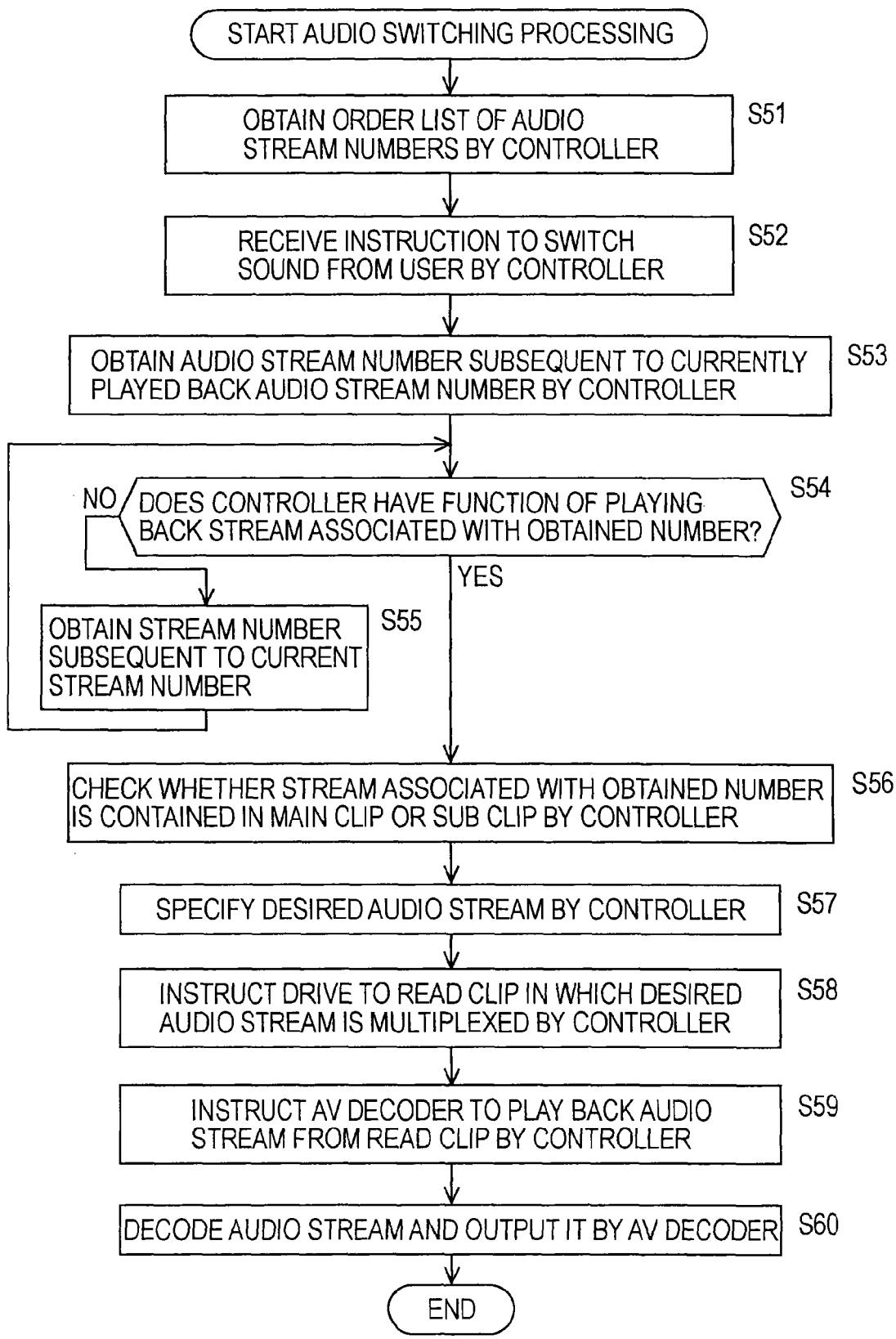
FIG. 29 is a flowchart illustrating processing when an instruction to switch audio is given by a user.

Reference is first given to the flowchart in FIG. 29 to discuss processing when an instruction to switch sound is given by the user. This processing is executed when the playback processing shown in FIGS. 26 through 28 is being performed.

In step S51, the controller 34 obtains an order list of audio stream numbers (may be IDs). More specifically, the controller 34 refers to STN_table( ) of PlayItem( ) discussed with reference to FIG. 14 to obtain the order list of audio stream numbers (IDs) entered in STN_table( ) discussed with reference to FIG. 15. This processing is executed when the playback processing shown in FIGS. 26 through 28 is started.

In response to an instruction to switch sound given by the user via the user interface, in step S52, the controller 34 receives the instruction to switch sound given by the user. That is, in FIG. 29, step S51 has been executed, and in response to an instruction to switch sound from the user, step S52 is executed.

In step S53, the controller 34 obtains the audio stream number subsequent to the audio stream number which is currently played back. For example, if the audio stream (although it is indicated by Text based subtitle in FIG. 9, it is read as the audio stream file in this example) having SubClip_entry_id=0 shown in FIG. 9 is played back, the audio stream number having SubClip_entry_id=1 is obtained.

In step S54, the controller 34 determines whether the playback apparatus 20 has a function of playing back the audio stream associated with the obtained number. More specifically, the controller 34 makes this determination based on the information indicated in stream_attribute( ) (FIG. 17). If it is determined in step S54 that the function of playing back the audio stream associated with the obtained number is not provided, the process proceeds to step S55 in which the controller 34 obtains the stream number subsequent to the current stream number. That is, if the function of playing back the audio stream associated with the current stream number is not provided, the current stream number is skipped (which is not to be played back), and the subsequent stream number is obtained. Then, after step S55, the process returns to step S54, and the subsequent processing is repeated. That is, the processing is repeated until an audio stream number that can be played back by the playback apparatus 20 can be obtained.

If it is determined in step S54 that the function of playing back the audio stream associated with the obtained number is provided, the process proceeds to step S56. In step S56, the controller 34 checks whether the audio stream is contained in the main clip or a sub clip. In the example shown in FIG. 9, since the obtained SubClip_entry_id=1 is referred to by the Sub Path, the controller 34 can determine that the audio stream associated with the obtained number is contained in the sub clip.

In step S57, the controller 34 specifies a desired audio stream. More specifically, the controller 34 specifies a desired audio stream contained in the main clip or the sub clip associated with the obtained number. More specifically, type=3 is specified in STN_table( ) discussed with reference to FIG. 16.

In step S58, the controller 34 instructs the storage drive 31 to read the clip (main clip or sub clip) in which the desired audio stream is multiplexed. The storage drive 31 reads the target clip based on this instruction.

In step S59, the controller 34 instructs the AV decoder 33 to play back the audio stream from the read clip.

In step S60, the AV decoder 33 decodes the audio stream and outputs it. More specifically, the audio data decoded by the audio decoder 75 and the sound data output from the buffer 95 are processed by the audio data processor 97, and the resulting data is output as an audio signal.

According to this processing, the selection performed by the switch 59 shown in FIG. 25 in step S21 in FIG. 27 is determined. More specifically, if the target clip shown in FIG. 29 is the main clip, the switch 59 supplies the audio stream supplied from the main side, i.e., the PID filter 55, to the audio decoder 75. If the target clip is a sub clip, the switch 59 supplies the audio stream supplied from the sub side, i.e., the PID filter 56, to the audio decoder 75.

In this manner, the controller 34 can control switching of sound (audio) based on STN_table( ) of PlayItem. By referring to stream_attribute of STN_table( ), the controller 34 can control switching of the playback operation by selecting streams that can be played back by the playback apparatus 20.

Although in the processing shown in FIG. 29 audio is switched based on audio stream numbers, audio may be switched based on audio stream IDs (audio_stream_id). In this case, the number obtained by subtracting one from the audio stream number is the audio stream ID.

Figure 30:
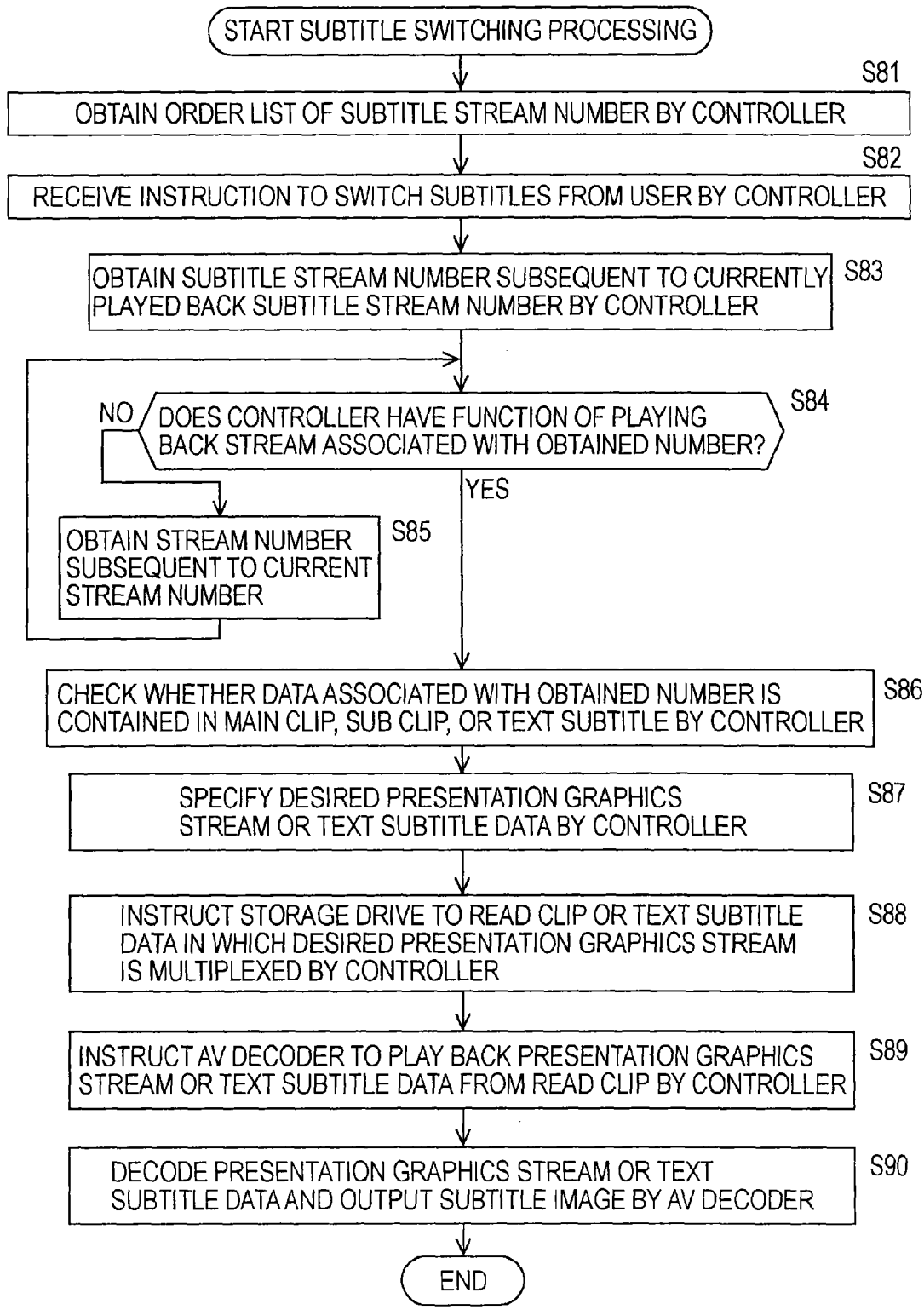
FIG. 30 is a flowchart illustrating processing when an instruction to switch subtitles is given by a user.

A description is now given, with reference to the flowchart in FIG. 30, of processing when an instruction to switch subtitles is given by the user. This processing is executed when the playback processing shown in FIGS. 26 through 28 is being performed.

In step S81, the controller 34 obtains an order list of subtitle stream numbers (may be IDs). More specifically, the controller 34 refers to STN_table( ) of PlayItem( ) discussed with reference to FIG. 14 to obtain the order list of subtitle stream ID (PG_txtST_stream_id) entered in STN_table( ) discussed with reference to FIG. 15. This processing is executed when the playback processing shown in FIGS. 26 through 28 is started.

In response to an instruction to switch subtitles given by the user via the user interface, in step S82, the controller 34 receives the instruction to switch subtitles given by the user. That is, in FIG. 30, step S81 has been executed, and in response to an instruction to switch subtitles from the user, step S82 is executed.

In step S83, the controller 34 obtains the subtitle stream number subsequent to the subtitle stream number which is currently played back. For example, if the Text based subtitle in FIG. 9 having SubClip_entry_id=0 shown in FIG. 9 is played back, the Text based subtitle number having SubClip_entry_id=1 is obtained.

In step S84, the controller 34 determines whether the playback apparatus 20 has a function of playing back the subtitle stream associated with the obtained number. More specifically, the controller 34 makes this determination based on the information indicated in stream_attribute( ) (FIG. 17). If it is determined in step S84 that the function of playing back the subtitle stream associated with the obtained number is not provided, the process proceeds to step S85 in which the controller 34 obtains the stream number subsequent to the current stream number. That is, if the function of playing back the subtitle stream associated with the current stream number is not provided, the current stream number is skipped (which is not played back), and the subsequent stream number is obtained. Then, after step S85, the process returns to step S84, and the subsequent processing is repeated. That is, the processing is repeated until a subtitle stream number that can be played back by the playback apparatus 20 can be obtained.

If it is determined in step S84 that the function of playing back the subtitle stream associated with the obtained number is provided, the process proceeds to step S86. In step S86, the controller 34 checks whether the data corresponding to the obtained number (subtitle stream number subsequent to the currently played back subtitle stream) is contained in the main clip (Main Path), a sub clip (Sub Path), or a text subtitle data file (Sub Path).

In step S87, the controller 34 specifies a desired presentation graphics stream or text subtitle data. More specifically, the controller 34 specifies a desired presentation graphics stream contained in the main clip or the sub clip or desired text subtitle title data from the text subtitle file.

In step S88, the controller 34 instructs the storage drive 31 to read the clip (main clip or sub clip) in which the desired presentation graphics stream is multiplexed or to read the desired text subtitle data.

In step S89, the controller 34 instructs the AV decoder 33 to play back the presentation graphics stream from the read clip or the text subtitle data.

In step S90, the AV decoder 33 decodes the presentation graphics stream or the text subtitle data and outputs the subtitle image. More specifically, a plane is generated from the decoded presentation graphics stream or text subtitle data by the presentation graphics plane generator 93, and is combined by the video data processor 96 and is output as video.

According to this processing, the selection performed by the switch 77 shown in FIG. 25 in step S29 in FIG. 28 is determined. More specifically, if the target data in step S87 in FIG. 30 is a presentation graphics stream, the switch 77 supplies the presentation graphics data supplied from the presentation graphics decoder 73 to the presentation graphics plane generator 93. If the target data is text subtitle data, the switch 77 supplies the text subtitle data supplied from the Text-ST composition 76 to the presentation graphics plane generator 93. The controller 34 can control switching of the playback operation by selecting only streams that can be played back by the playback apparatus 20.

Although in the processing shown in FIG. 30, the subtitles are switched based on the subtitle stream numbers, the subtitles may be switched based on the subtitle stream IDs (PG_txtST_stream_id). In this case, the number obtained by subtracting one from the subtitle stream number is the subtitle stream ID.

By providing the Main Path and the Sub Path in the PlayList, audio or subtitles can be selected from streams or data files different from the main AV stream when an instruction to switch audio or subtitles is given by the user.

The PlayItem in the Main Path includes data multiplexed into an AV stream file and the Stream Number Definition table defining the type of data referred to by the Sub Path is provided. Thus, streams having higher extensibility can be implemented.

By referring to stream_attribute in STN_table( ), the playback apparatus 20 can sequentially select and play back only streams that can be played back by the playback apparatus 20.

The above-described processing can be summarized as follows.

The playback apparatus 20 obtains PlayList, which serves as playback management information, including Main Path, which is the main playback path, indicating the position of an AV stream file recorded on a recording medium, and Sub Paths, which serve as a plurality of sub playback paths, indicating the positions of sub clips including accompanying data (for example, audio stream data or bitmap subtitle stream file data) played back in synchronization with the playback timing of main image data (video stream data) included in the AV stream file referred to by the main playback path. The playback apparatus 20 selects accompanying data to be played back, based on an instruction from the user, from among accompanying data (for example, audio stream file data)

played back in synchronization with video stream data included in the AV stream file referred to by the Main Path and accompanying data (for example, audio stream file data) included in the sub clips referred to by the Sub Paths. In the processing shown in FIG. 29 or 30, an instruction to switch subtitles or audio is given. Then, the playback apparatus 20 determines whether the playback apparatus 20 has a playback function of playing back the selected accompanying data (for example, audio stream file data). The controller 34 can determine whether the controller 34 (playback apparatus 20) can play back the accompanying data by referring to stream_attribute in STN_table( ). If it is determined that the playback apparatus 20 has a function of playing back the selected accompanying data and if the accompanying data is contained in a sub clip referred to by a Sub Path, the sub clip referred to by the Sub Path is read and combined with the main AV stream file (main clip) referred to by the Main Path, and is played back. For example, if, as the accompanying data to be played back, audio stream file data referred to by a Sub Path is selected by the user (if an instruction to switch audio is given by the user), the playback apparatus 20 combines the audio stream file data referred to by the Sub Path with a main clip AV stream file, i.e., an MPEG2 video stream file, a presentation graphics stream file, or an interactive graphics stream file, and plays back the combined data. That is, the decoded audio stream file selected by the user is played back as audio.

As described above, since the PlayList includes the Main Path and Sub Path, which refer to different clips, the extensibility of streams can be achieved. Since one Sub Path can refer to a plurality of files (for example, FIGS. 9 and 10), the user can select from among a plurality of different streams.

Further, in the PlayItem of the Main Path, STN_table( ) shown in FIG. 15 is disposed as a table defining accompanying data multiplexed (included) in the AV stream file referred to by the Main Path and accompanying data referred to by the Sub Paths. Thus, streams having higher extensibility can be implemented. The Sub Path can be easily extended by being entered in STN_table( ).

The provision of stream_attribute( ) shown in FIG. 17, which is attribute information concerning streams, in STN_table( ) makes it possible to determine whether the selected stream can be played back by the playback apparatus 20. Also, by referring to stream_attribute( ), only streams that can be played back by the playback apparatus 20 can be selected and played back.

The Sub path includes SubPath_type indicating the type of Sub Path (such as audio or text subtitle), as shown in FIG. 12, Clip_information_file_name shown in FIG. 13 indicating the name of the sub clip referred to by the Sub Path, and SubPlayItem_IN_time and SubPlayItem_OUT_time shown in FIG. 13 indicating the IN point and the OUT point, respectively, of the clip referred to by the Sub Path. Accordingly, the data referred to by the Sub Path can be precisely specified.

The Sub Path also includes sync_PlayItem_id (for example, sync_PlayItem_id shown in FIG. 7 or 9), which serves as specifying information for specifying the AV stream file on the Main Path, for playing back the Sub Path simultaneously with the Main Path, and sync_start_PTS_of_PlayItem (for example, sync_start_PTS_of_PlayItem shown in FIG. 7 or 9), which is the time on the Main Path, on which the IN point of the data referred to by the Sub Path is started in synchronization with the Man Path on the time axis of the Main Path. Accordingly, data (file) referred to by the Sub Path can be played back in synchronization with the main clip AV stream file referred to by the Main Path, as shown in FIG. 7 or 9.

Data read by the storage drive 31 shown in FIG. 25 may be data recorded on a recording medium, such as a DVD (Digital Versatile Disc), data recorded on a hard disk, data downloaded via a network (not shown), or data combined from such data. For example, data may be played back based on Playlist and a sub clip recorded on a hard disk and a main clip AV stream file recorded on a DVD. Alternatively, if PlayList, using a clip AV stream file recorded on a DVD as a sub clip, and a main clip are recorded on a hard disk, the main clip and the sub clip may be read and played back from the hard disk and DVD, respectively, based on the PlayList recorded on the hard disk.

The above-described series of processing operations may be executed by hardware or software. In this case, the processing operations can be performed by a personal computer 500 shown in FIG. 31.

Figure 31:
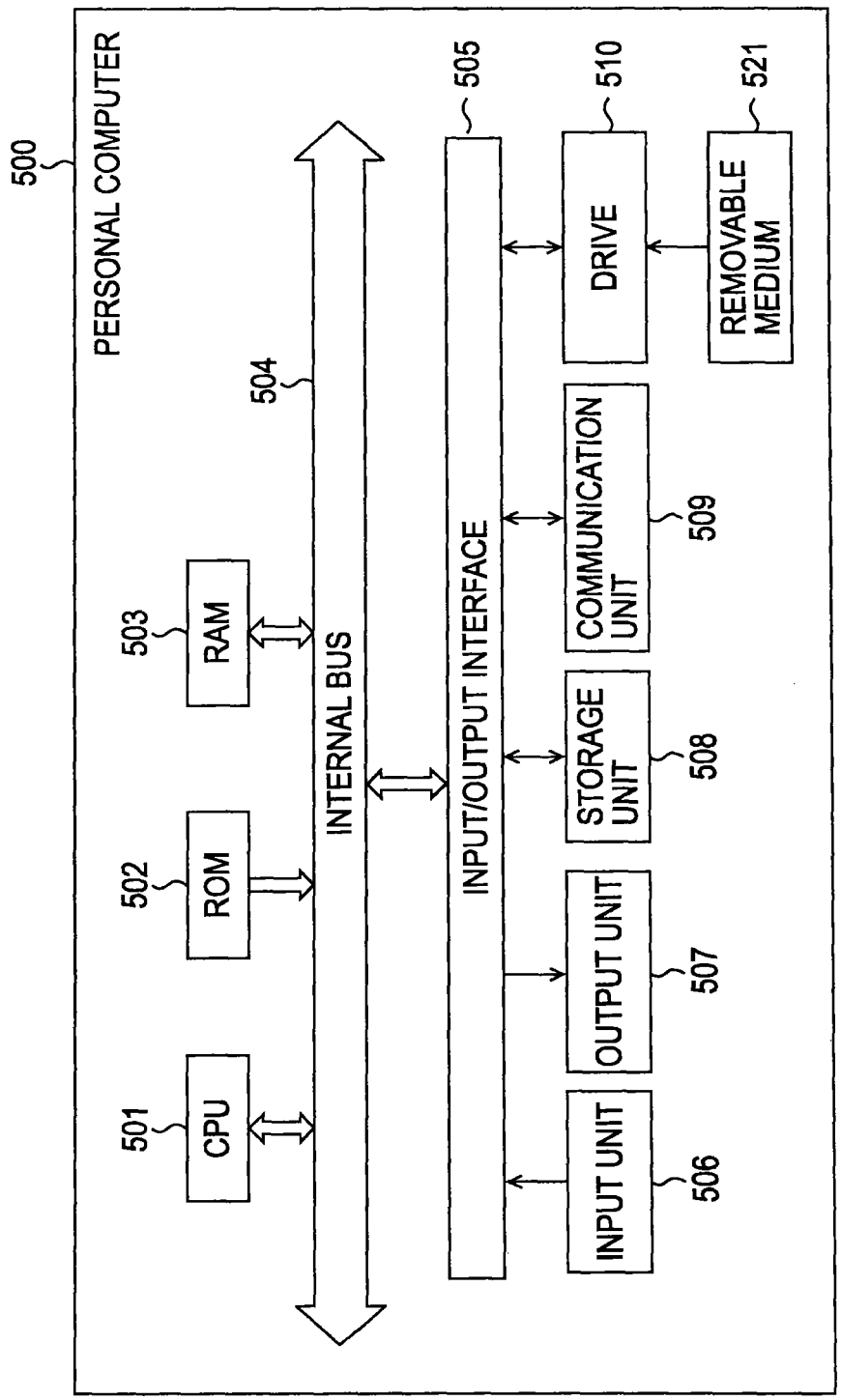
FIG. 31 illustrates the configuration of a personal computer.

In FIG. 31, in the personal computer 500, a CPU (Central Processing Unit) 501 executes various processing operations according to a program stored in a ROM (Read Only Memory) 502 or a program loaded into a RAM (Random Access Memory) 503 from a storage unit 508. In the RAM 503, data necessary for the CPU 501 to execute various processing operations is also stored.

The CPU 501, the ROM 502, and the RAM 503 are connected to each other via an internal bus 504. An input/output interface 505 is also connected to the internal bus 504.

The input/output interface 505 is connected to an input unit 506, such as a keyboard and a mouse, an output unit 507, such as a display, for example, a CRT or an LCD, the storage unit 508, such as a hard disk, and a communication unit 509, such as a modem or a terminal adapter. The communication unit 509 performs communication via various networks including telephone lines or CATV.

A drive 510 is connected to the input/output interface 505 if necessary. A removable medium 521, such as a magnetic disk, an optical disc, a magneto-optical disk, or a semiconductor memory, is installed in the drive 510. A computer program read from the removable medium 521 is installed into the storage unit 508.

If software is used for executing the series of processing operations, a corresponding software program is installed from a network or a recording medium.

This recording medium may be formed of a package medium, such as the removable medium 521, recording the program thereon, as shown in FIG. 31, which is distributed to the user separately from the computer. Alternatively, the recording medium may be formed of the ROM 502 or a hard disk forming the storage unit 508 recording the program thereon, which is distributed to the user while being built in the computer.

In this specification, steps forming the computer program may be executed in chronological order described in this specification. Alternatively, they may be executed in parallel or individually.

In this specification, the system represents the overall apparatus including a plurality of devices.

The invention claimed is:

1. A playback apparatus comprising:
circuitry configured to
obtain (i) playback management information including a main playback path indicating a position of an AV stream file recorded on a recording medium and (ii) second information having at least one sub playback path indicating positions of a plurality of sub files including accompanying data to be played back with playback of main image data included in the AV stream file, each of the plurality of sub files being designated in the sub playback paths by a sub play item in-time and a sub play item out-time common to each sub file and by a specific subclip entry ID uniquely set for each sub file, select accompanying data to be played back from supplementary streams or data files different from a main AV stream, referred to by the sub playback paths, read, when the selected accompanying data is included in a sub file referred to by a sub playback path, the sub file referred to by the sub playback path together with the AV stream file referred to by the main playback path, and play back the main image data included in the AV stream file and the accompanying data included in the selected sub file.

2. The playback apparatus according to claim 1, wherein the playback management information including includes a table defining the accompanying data included in the AV stream file referred to by the main playback path and the accompanying data referred to by the sub playback paths, and the circuitry is further configured to select the accompanying data to be played back, based on the instruction from the user, from among the accompanying data defined in the table.

3. The playback apparatus according to claim 1, wherein the circuitry is further configured to determine whether the playback apparatus has a function of playing back the selected accompanying data, wherein when it is determined that the playback apparatus has a function of playing back the accompanying data and when the accompanying data is included in a sub file referred to by a sub playback path, the circuitry is further configured to read the sub file referred to by the sub playback path together with the AV stream file referred to by the main playback path, and play back the main image data included in the AV stream file and the accompanying data included in the selected sub file.

4. The playback apparatus according to claim 2, wherein the circuitry is further configured to determine whether the playback apparatus has a function of playing back the selected accompanying data, wherein when it is determined that the playback apparatus has a function of playing back the accompanying data and when the accompanying data is included in a sub file referred to by a sub playback path, the circuitry reads the sub file referred to by the sub playback path together with the AV stream file referred to by the main playback path, and plays back the main image data included in the AV stream file and the accompanying data included in the selected sub file.

5. The playback apparatus according to claim 4, wherein the table further defines attribute information concerning accompanying data, and the circuitry is further configured to determine whether the playback apparatus has a function of playing back the accompanying data based on attribute information concerning the accompanying data defined in the table.

6. The playback apparatus according to claim 1, wherein the second information includes type information concerning the types of the sub playback paths, file names of the sub files referred to by the sub playback paths, and IN points and OUT points of the sub files referred to by the sub playback paths.

7. The playback apparatus according to claim 6, wherein the second information further includes specifying information for specifying the AV stream file referred to by the main playback path to play back the sub playback paths with the main playback path, and a time on the main playback path for allowing the IN points to be started in synchronization with the main playback path on the time axis of the main playback path.

8. A playback method comprising:

obtaining, using circuitry of a playback apparatus, (i) playback management information including a main playback path indicating a position of an AV stream file recorded on a recording medium and (ii) second information having at least one sub playback path indicating positions of a plurality of sub files including accompanying data to be played back with playback of main image data included in the AV stream file, each of the plurality of sub files being designated in the sub playback paths by a sub play item in-time and a sub play item out-time common to each sub file and by a specific subclip entry ID uniquely set for each sub file;

selecting, using the circuitry of the playback apparatus, accompanying data to be played back from supplementary streams or data files different from a main AV stream, referred to by the sub playback paths;

reading, using the circuitry of the playback apparatus and when the selected accompanying data is included in a sub file referred to by a sub playback path, the sub file referred to by the sub playback path together with the AV stream file referred to by the main playback path; and playing back, using the circuitry of the playback apparatus, the main image data included in the AV stream file and the accompanying data included in the selected sub file.

9. A non-transitory computer readable medium including computer executable instructions allowing a computer to execute the method recited in claim 8.

10. A recording apparatus comprising:

circuitry configured to generate (i) playback management information including a main playback path indicating a position of an AV stream file to be recorded on a recording medium and (ii) second information having at least one sub playback path indicating positions of a plurality of sub files including accompanying data to be played back with playback of main image data included in the AV stream file, each of the plurality of sub files being designated in the sub playback paths by a sub play item in-time and a sub play item out-time common to each sub file and by a specific subclip entry ID uniquely set for each sub file, and record on the recording medium the AV stream file and a plurality of sub files along with the playback management information and the second information.

* * * * *